United States Patent
Kim et al.

(10) Patent No.: US 11,758,375 B2
(45) Date of Patent: Sep. 12, 2023

(54) INFORMATION PROCESSING APPARATUS, INFORMATION PROCESSING SYSTEM, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Yeonseo Kim, Miyoshi (JP); Shin Sakurada, Toyota (JP); Daisuke Tanabe, Nagoya (JP); Ayana Takeshita, Toyota (JP); Hiroyuki Tokita, Toyota (JP); Koichi Asamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 727 days.

(21) Appl. No.: 16/421,531

(22) Filed: May 24, 2019

(65) Prior Publication Data
US 2019/0380013 A1 Dec. 12, 2019

(30) Foreign Application Priority Data
Jun. 8, 2018 (JP) .................................. 2018-110188

(51) Int. Cl.
*H04W 4/40* (2018.01)
*H04W 4/029* (2018.01)
(Continued)

(52) U.S. Cl.
CPC .......... *H04W 4/40* (2018.02); *G01C 21/3647* (2013.01); *G06V 40/103* (2022.01);
(Continued)

(58) Field of Classification Search
CPC ........ G01C 21/00; G01C 21/26; G01C 21/34; G01C 21/36; G01C 21/3626;
(Continued)

(56) References Cited

U.S. PATENT DOCUMENTS

2012/0188200 A1* 7/2012 Roziere ............. G06F 3/041661
345/174
2012/0201468 A1 8/2012 Oami et al.
(Continued)

FOREIGN PATENT DOCUMENTS

JP H10-105889 A 4/1998
JP 2005-250614 A 9/2005
(Continued)

*Primary Examiner* — Charles J Han
(74) *Attorney, Agent, or Firm* — Oliff PLC

(57) ABSTRACT

The present disclosure has an object to provide an information processing apparatus that can easily grasp a passenger during a driver's driving. A controller included in an information processing apparatus according to the present disclosure executes: acquiring first information that is information related to an appearance of a passenger having requested a ride in a vehicle being driven by a driver and is image information taken; and generating information related to the passenger by converting the first information into second information representing a predetermined characteristic part of the appearance of the passenger.

9 Claims, 24 Drawing Sheets

| PASSENGER ID | FIRST INFORMATION | DRIVER ID | VEHICLE NUMBER | SCHEDULED MEETING TIME |
|---|---|---|---|---|
| C001 | | S001 | ... | 8:00 |
| C002 | | S002 | ... | 8:30 |
| | | | | |

(51) Int. Cl.
*G06V 40/16* (2022.01)
*G01C 21/36* (2006.01)
*H04W 4/16* (2009.01)
*G06V 40/10* (2022.01)

(52) U.S. Cl.
CPC .......... *G06V 40/172* (2022.01); *H04W 4/029* (2018.02); *H04W 4/16* (2013.01)

(58) Field of Classification Search
CPC . G01C 21/3647; G01C 21/3697; G06F 16/00; G06F 16/20; G06F 16/29; G06K 9/00; G06K 9/00221; G06K 9/00228; G06K 9/00288; G06K 9/00362; G06K 9/00369; G06K 9/00624; G06K 9/00832; G06K 9/00845; G06Q 10/00; G06Q 10/04; G06Q 30/00; G06Q 30/06; G06Q 30/0645; G06Q 50/00; G06Q 50/30; G08G 1/00; G08G 1/123; H04W 4/00; H04W 4/02; H04W 4/029; H04W 4/16; H04W 4/30

See application file for complete search history.

(56) References Cited

U.S. PATENT DOCUMENTS

2014/0112534 A1    4/2014   Sako et al.
2015/0023596 A1*   1/2015   Oami .................. G06K 9/3241
                                                          382/173

FOREIGN PATENT DOCUMENTS

| JP | 2005250614 A | * | 9/2005 |
| JP | 2014-085796 A | | 5/2014 |
| JP | 2016-218895 A | | 12/2016 |
| JP | 2016218895 A | * | 12/2016 |
| WO | 2011/046128 A1 | | 4/2011 |

* cited by examiner

[Fig. 1]
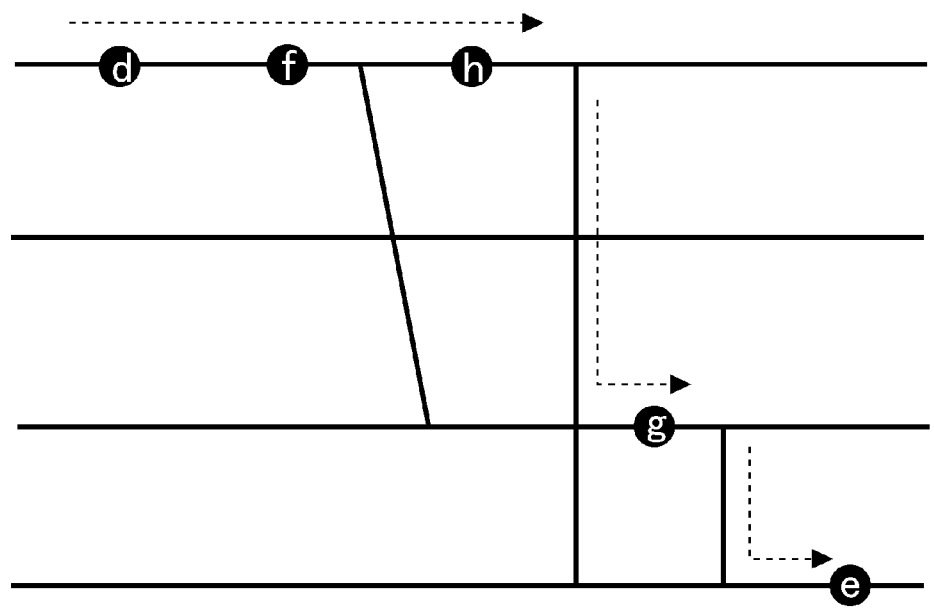

[Fig. 2]
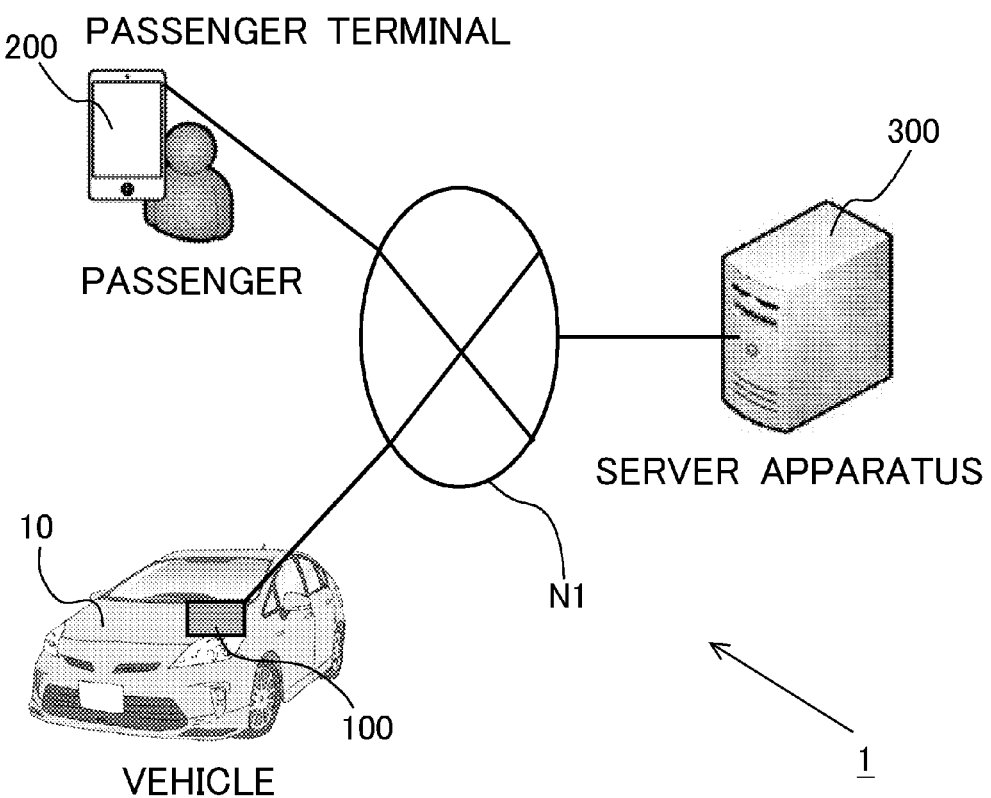

[Fig. 3]
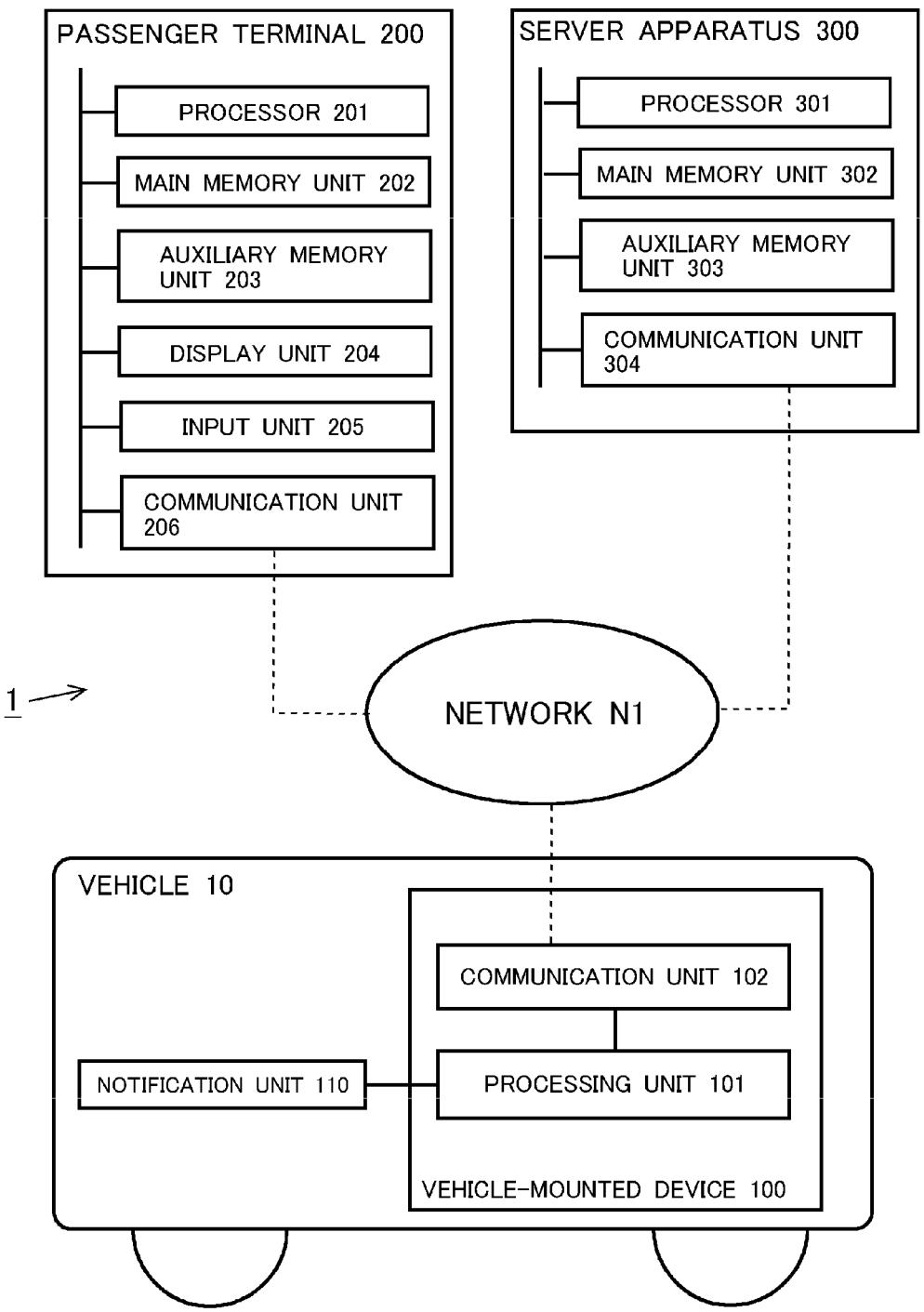

[Fig. 4]
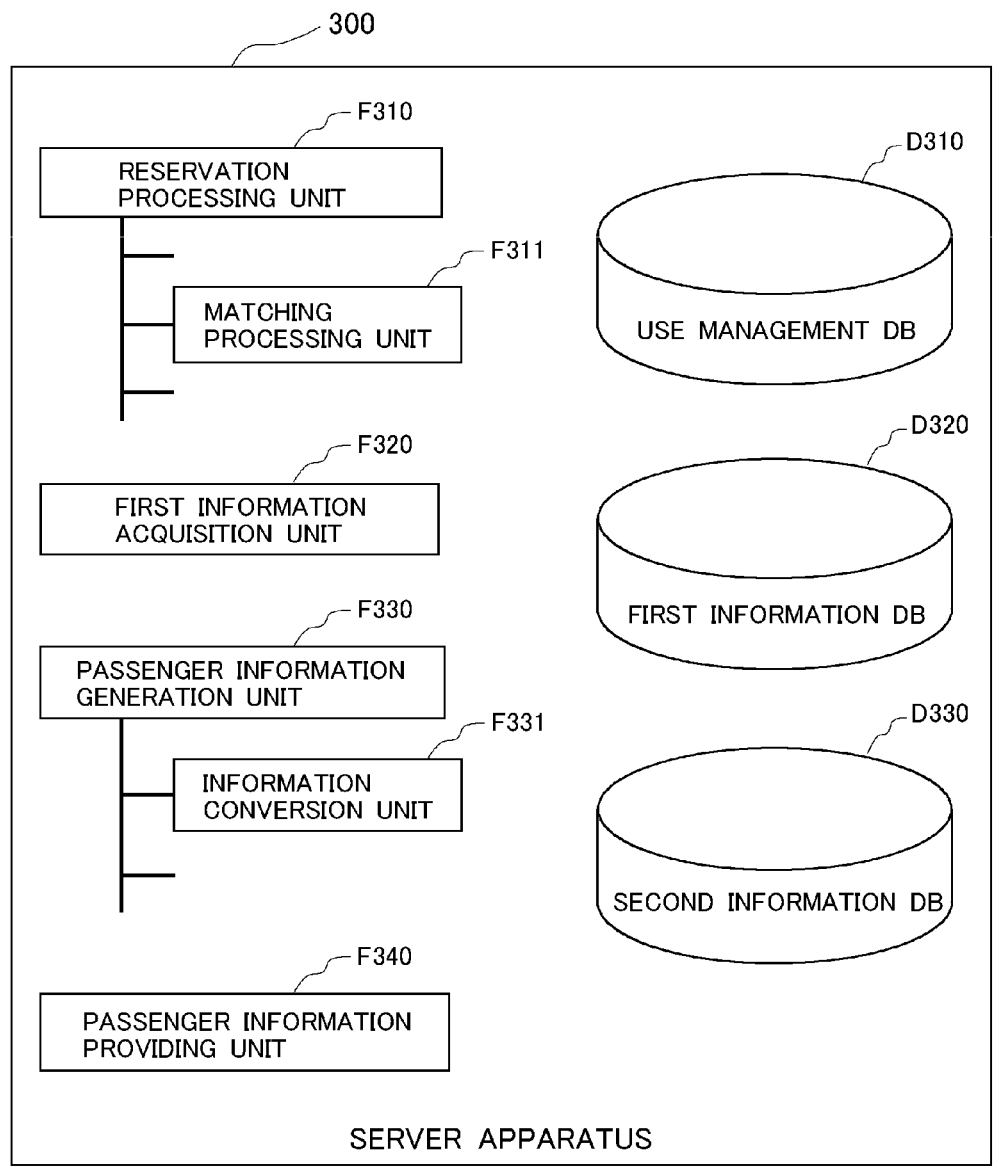

[Fig. 5]

| DRIVER ID | PASSENGER ID | VEHICLE NUMBER | SCHEDULED MEETING POINT | SCHEDULED MEETING TIME | DESTINATION POINT OF PASSENGER | DESIRED ARRIVAL TIME OF PASSENGER |
|---|---|---|---|---|---|---|
| S001 | C001 | ... | f | 8:00 | g | 9:00 |
| S002 | C002 | ... | h | 8:30 | e | 9:30 |
| | C003 | | i | 8:45 | j | 9:15 |
| | | | | | | |

[Fig. 6]
| PASSENGER ID | FIRST INFORMATION | DRIVER ID | VEHICLE NUMBER | SCHEDULED MEETING TIME |
|---|---|---|---|---|
| C001 | 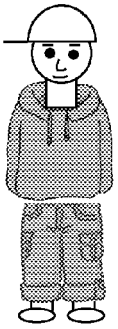 | S001 | ... | 8:00 |
| C002 | 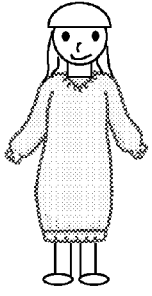 | S002 | ... | 8:30 |
|  |  |  |  |  |

[Fig. 7]

| PASSENGER ID | SECOND INFORMATION | DRIVER ID | VEHICLE NUMBER | SCHEDULED MEETING TIME |
|---|---|---|---|---|
| C001 | • 20'S MALE<br>• HEIGHT 170-180 cm<br>• WEARING GRAY PARKA AND WIDE JEANS PANTS<br>• WEARING RED CAP | S001 | ... | 8:00 |
| C002 | • 20'S FEMALE<br>• HEIGHT 150-160 cm<br>• WEARING PINK ONE-PIECE DRESS<br>• WEARING BROWN BERET | S002 | ... | 8:30 |
| | | | | |

[Fig. 8]
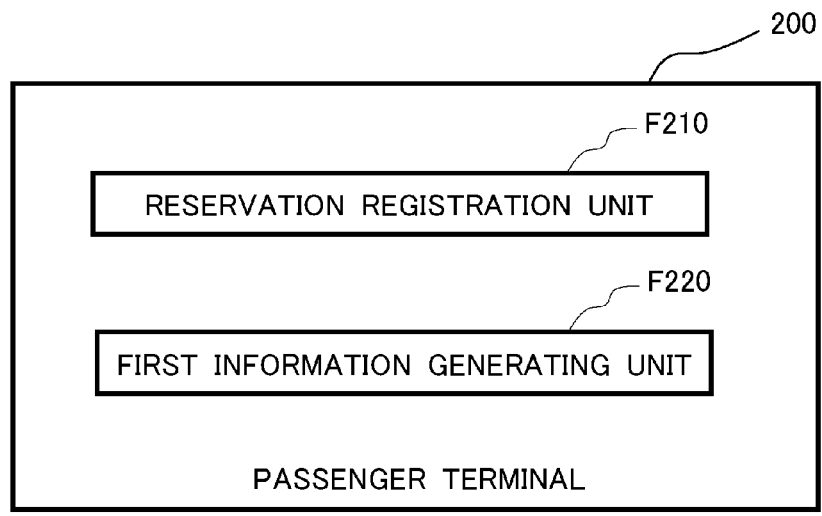

[Fig. 9]
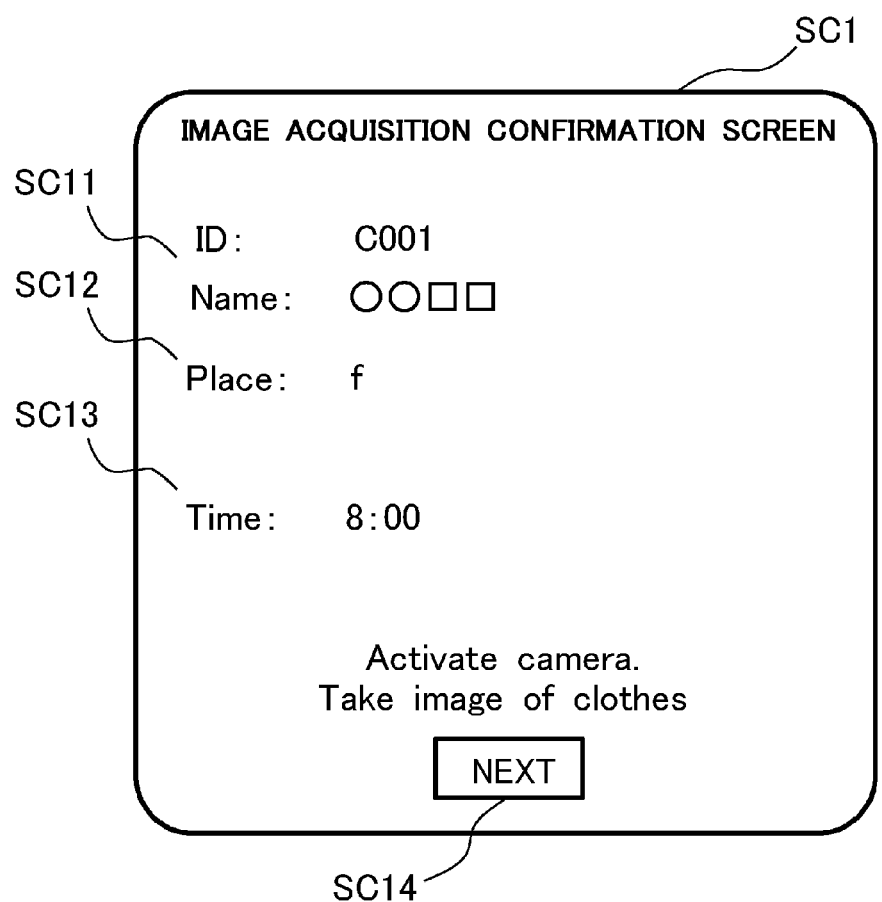

[Fig. 10A]
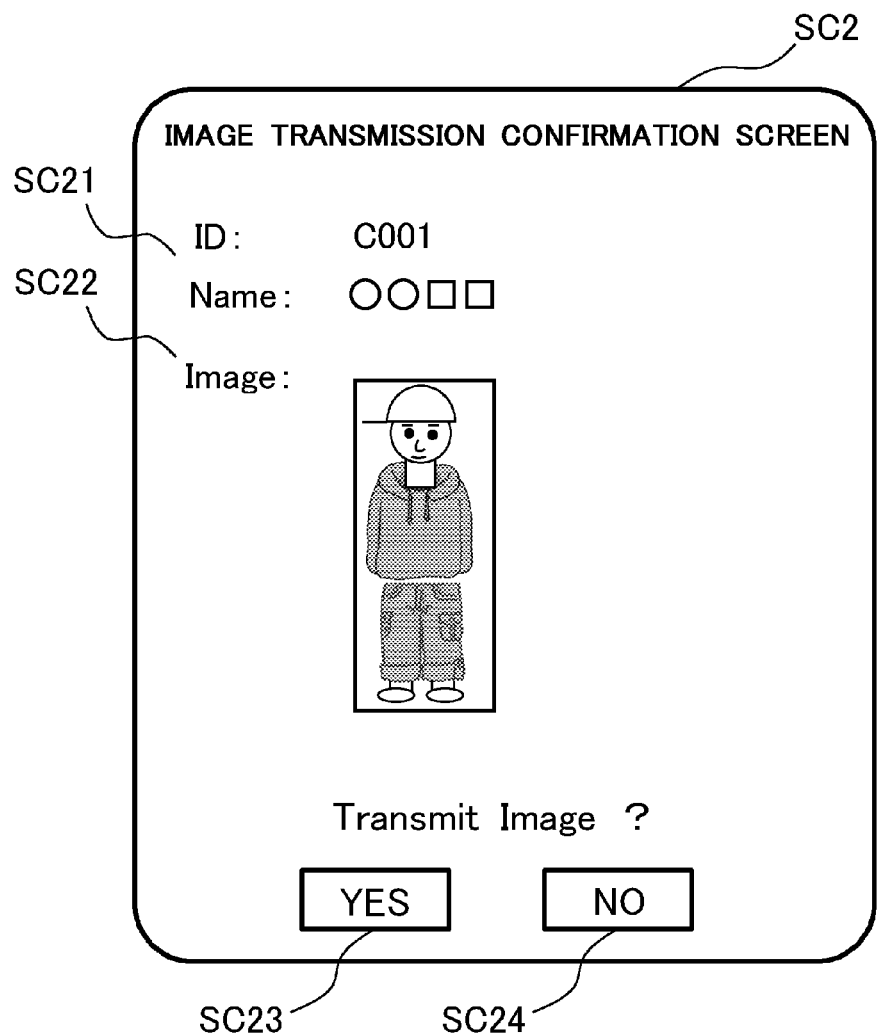

[Fig. 10B]
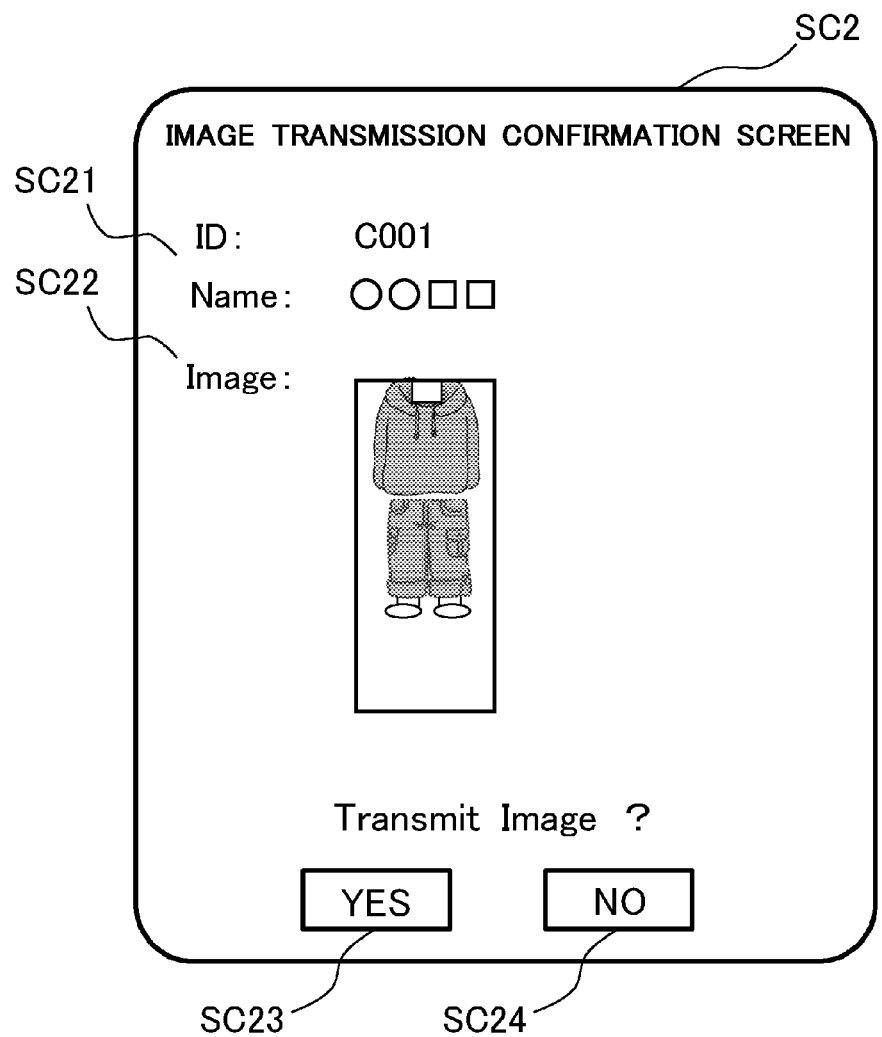

[Fig. 10C]
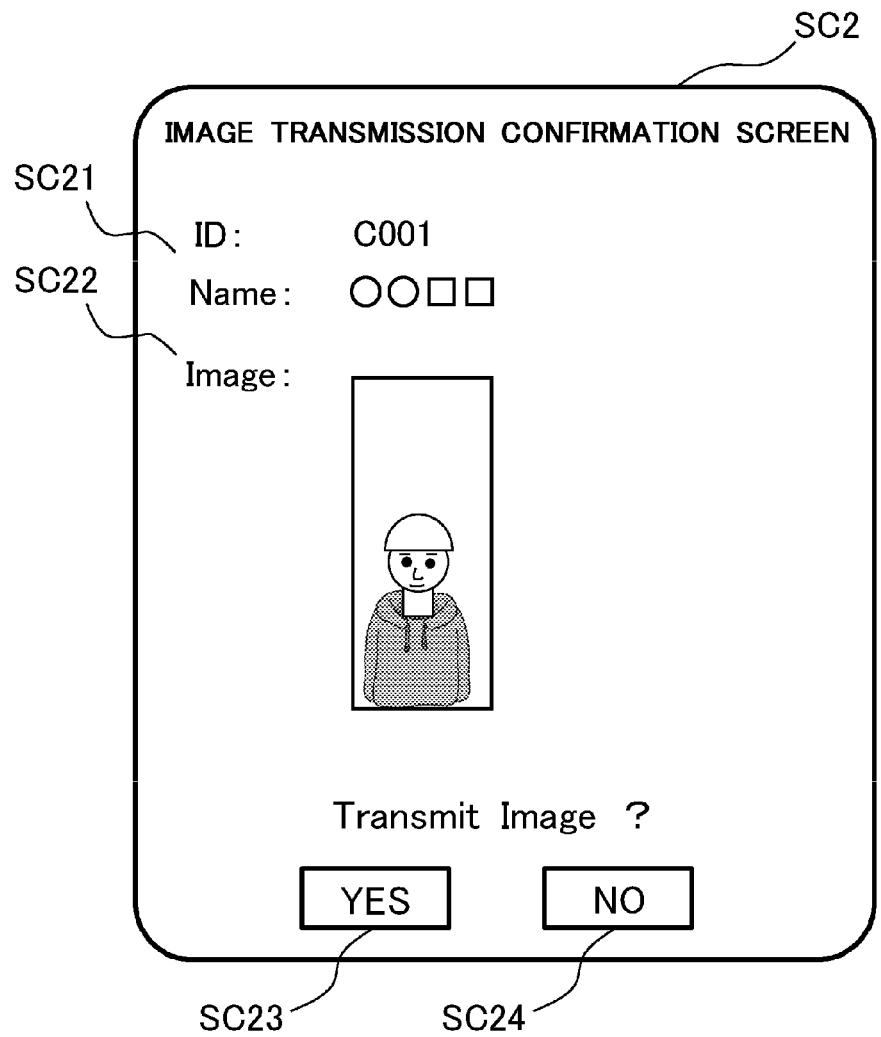

[Fig. 11]
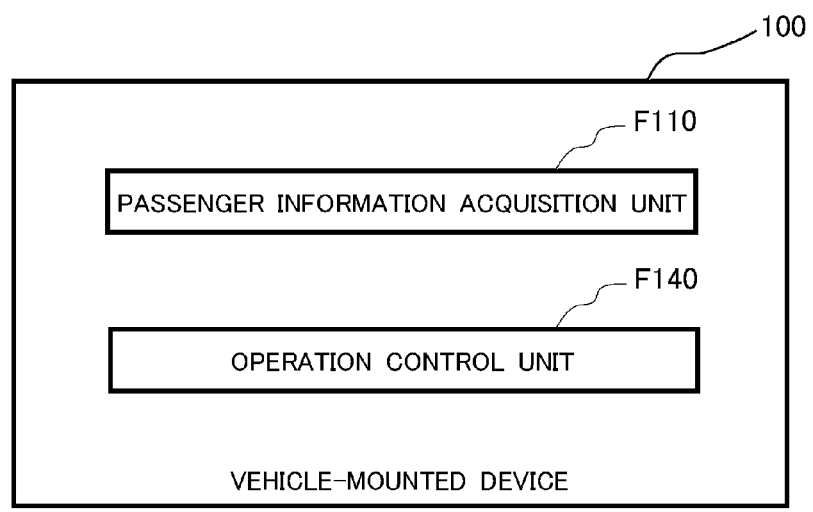

[Fig. 12]
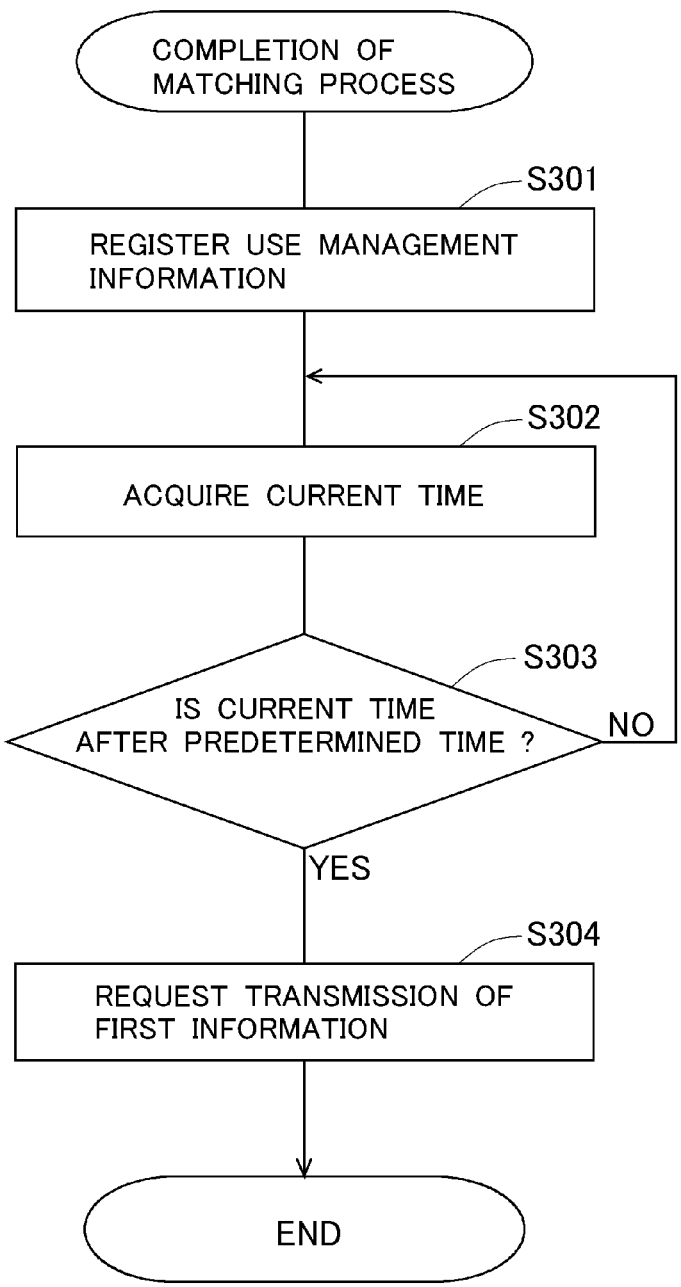

[Fig. 13]
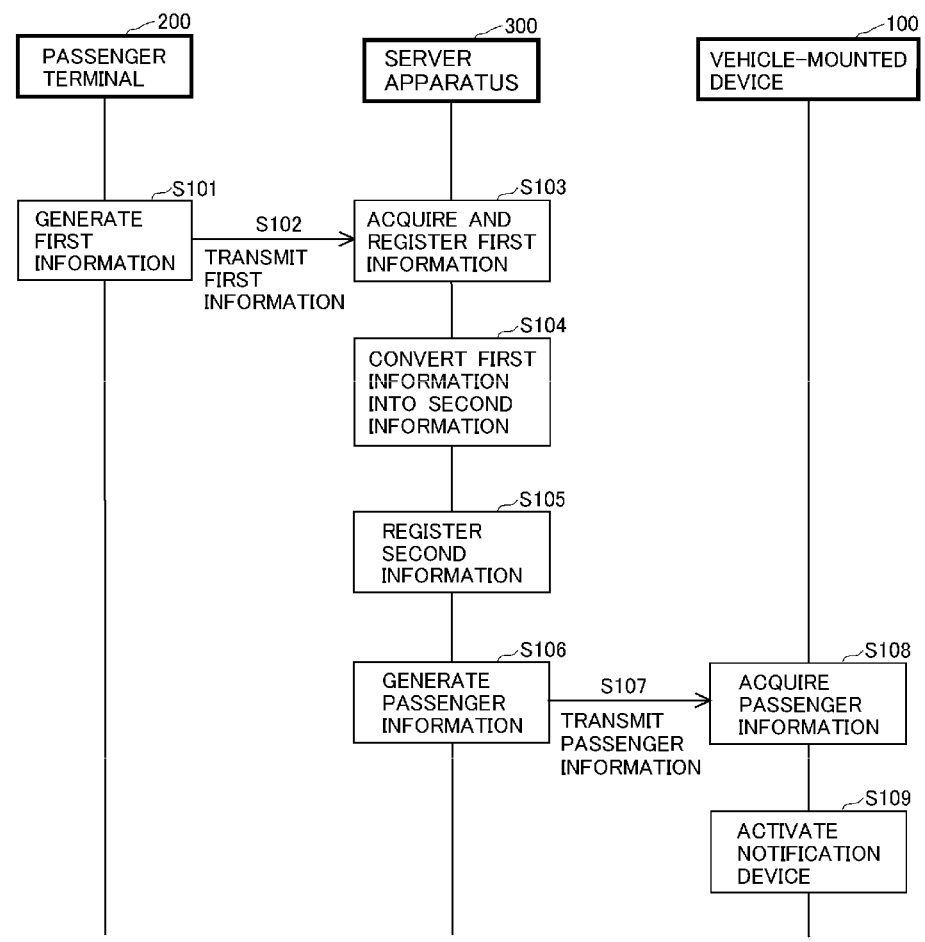

[Fig. 14]
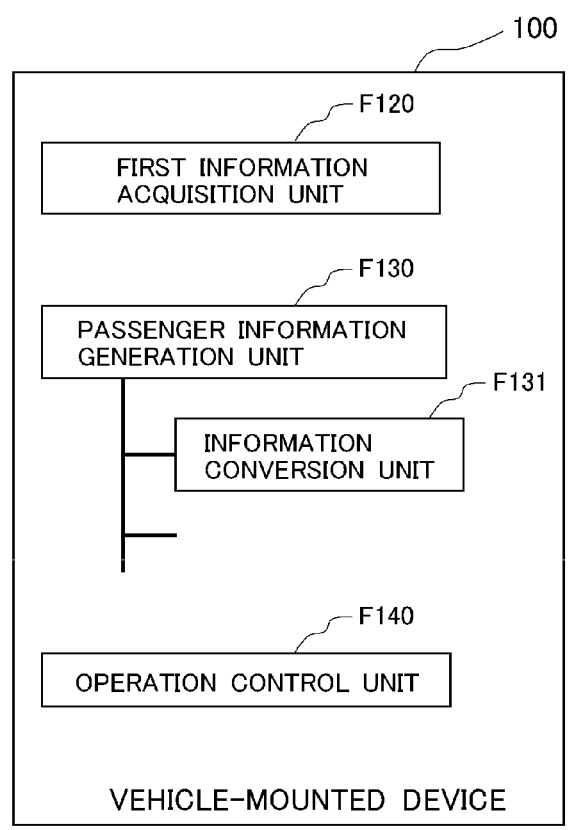

[Fig. 15]
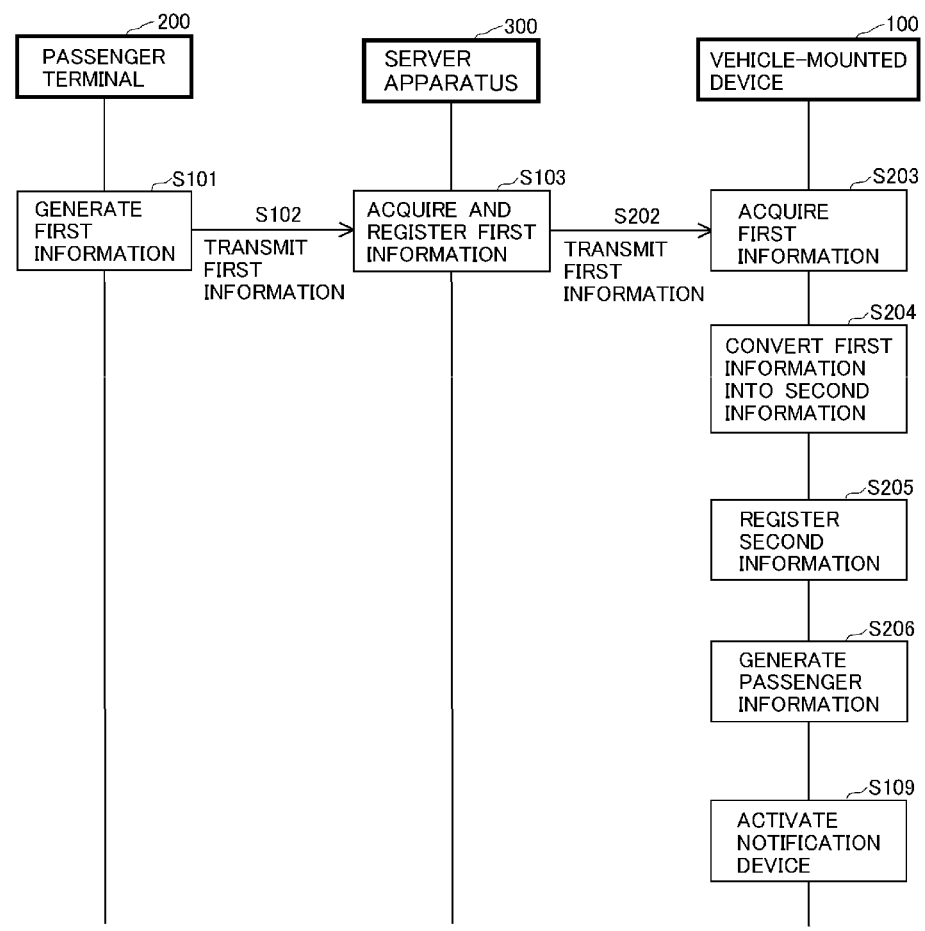

[Fig. 16]
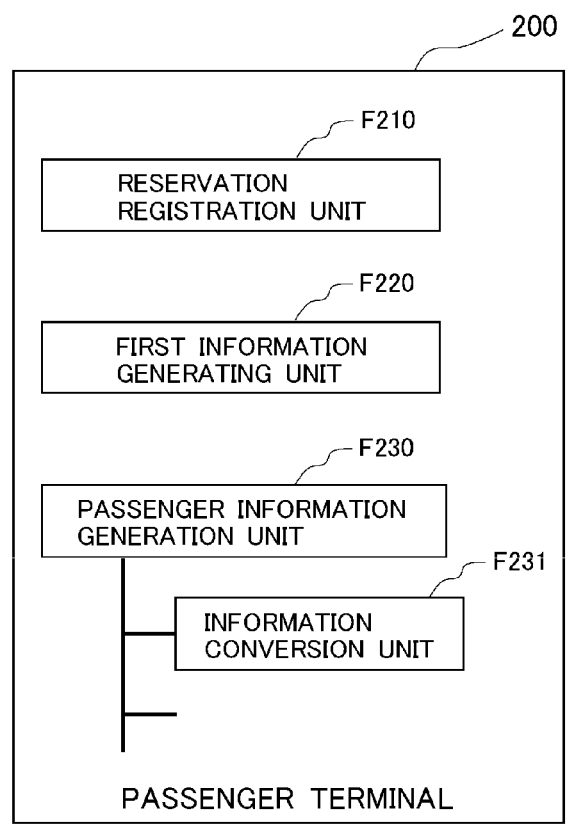

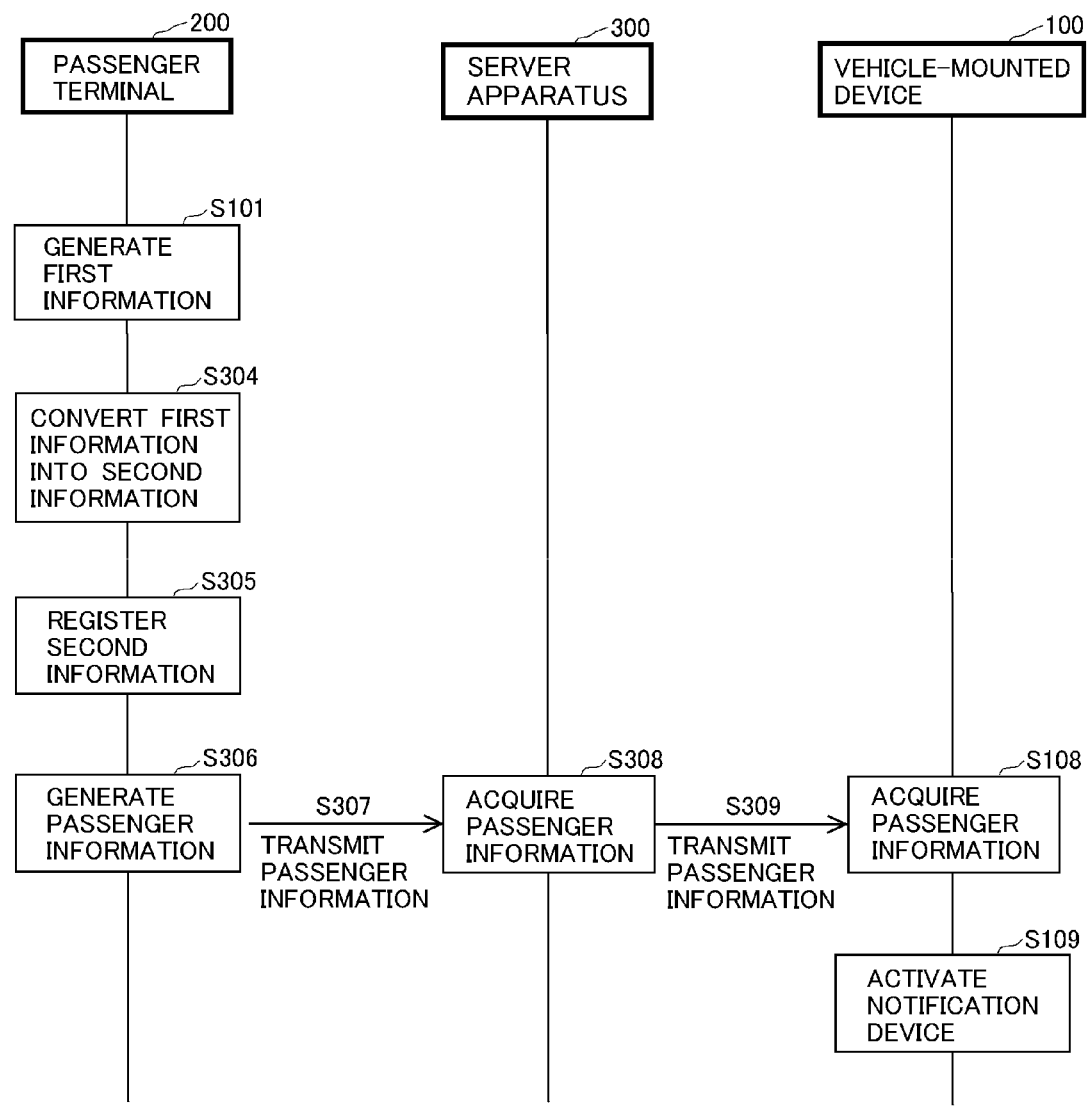
[Fig. 17]

[Fig. 18]
| PASSENGER ID | FIRST INFORMATION | DRIVER ID | VEHICLE NUMBER | SCHEDULED MEETING TIME |
|---|---|---|---|---|
| C001 | 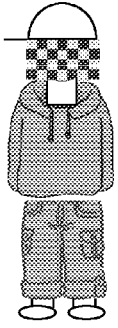 | S001 | ... | 8:00 |
| C002 | 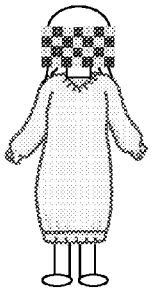 | S002 | ... | 8:30 |
|  |  |  |  |  |

[Fig. 19]
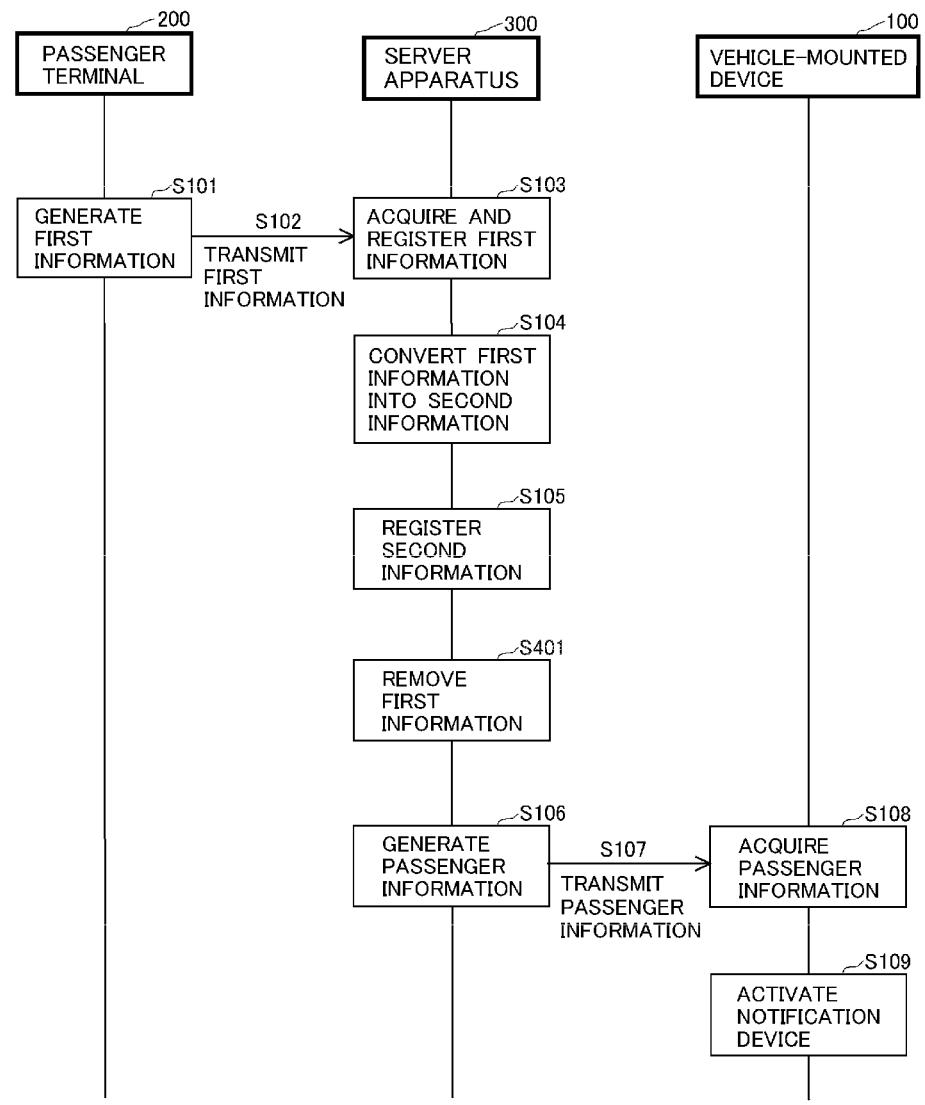

[Fig. 20]
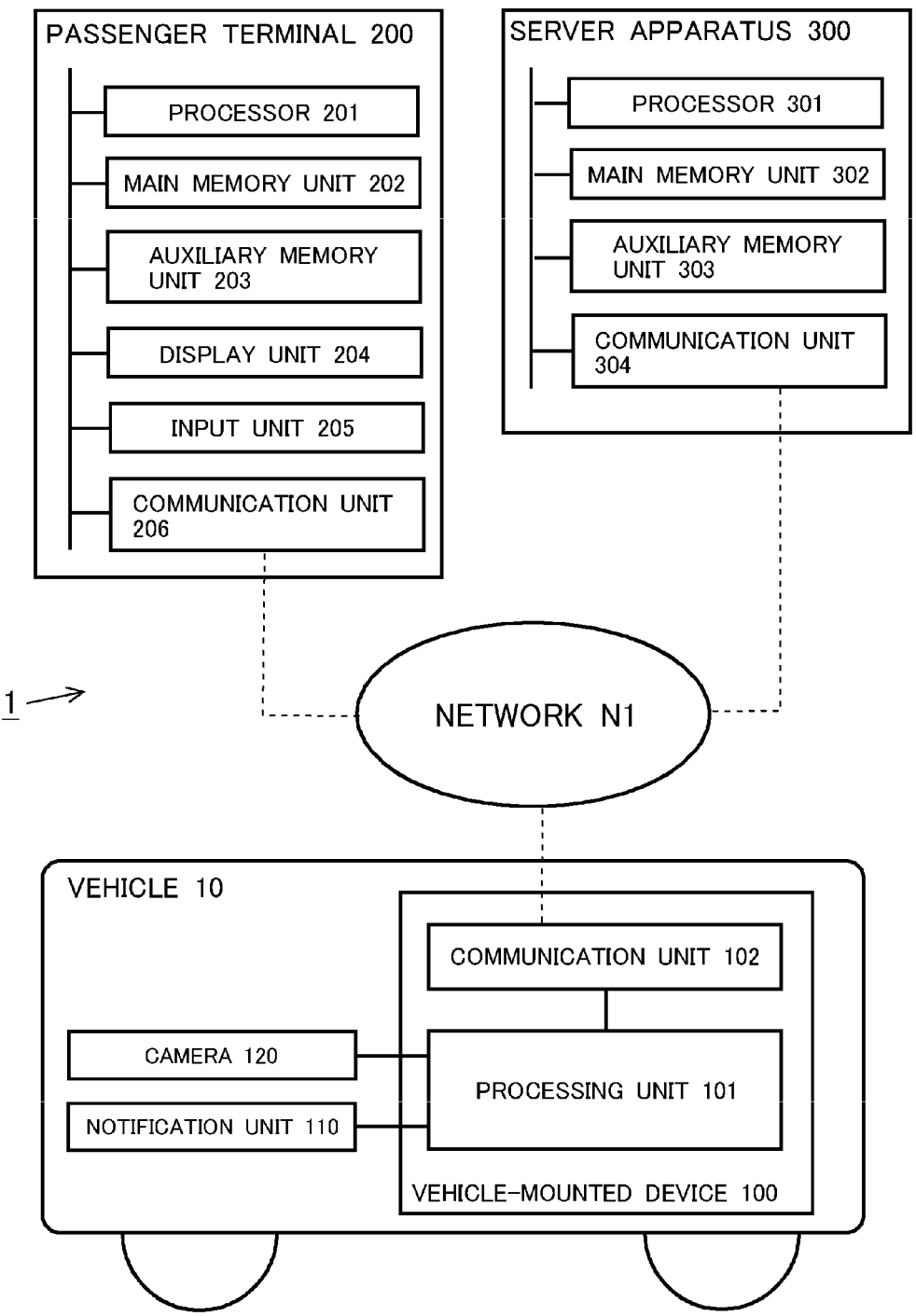

[Fig. 21]
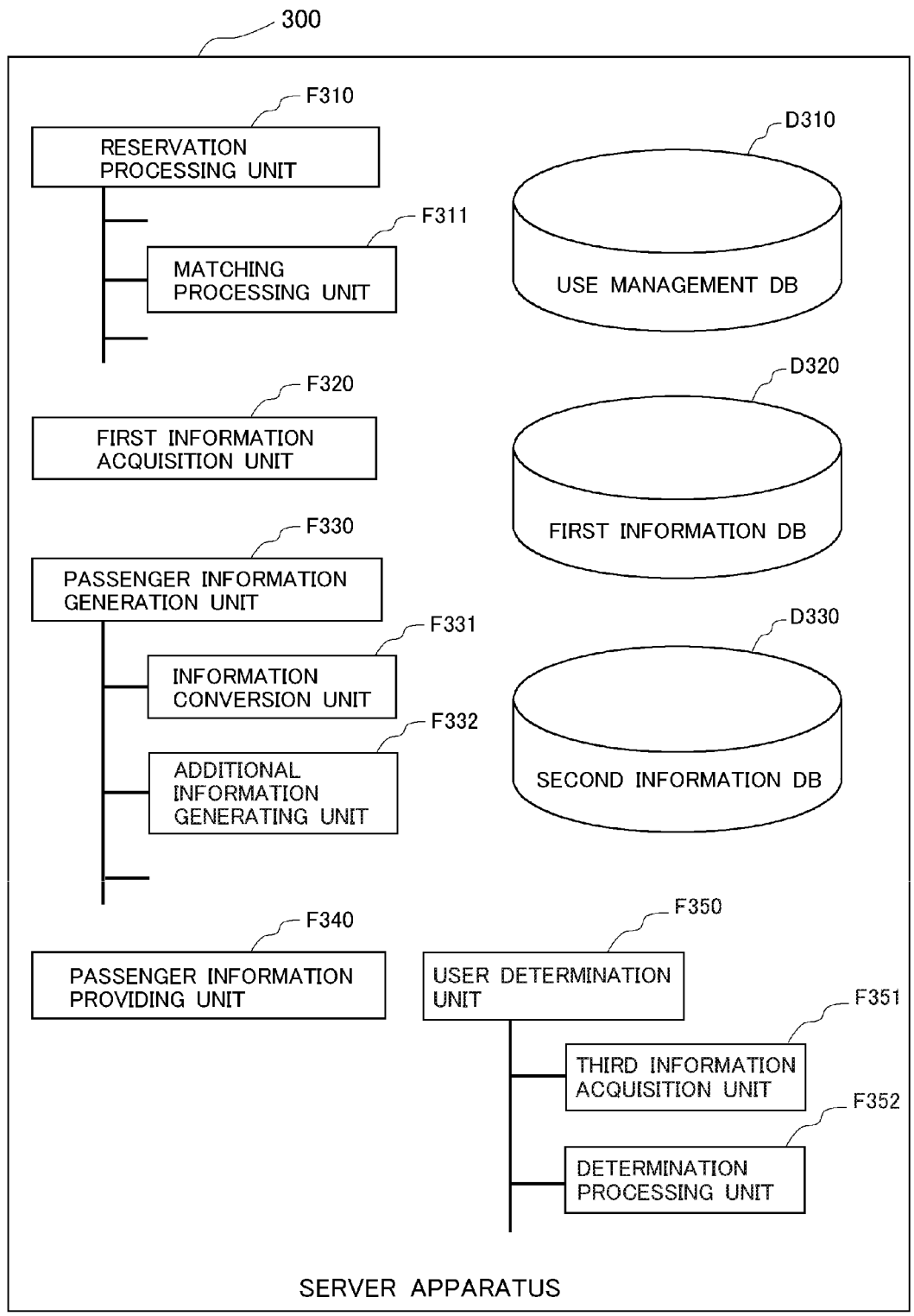

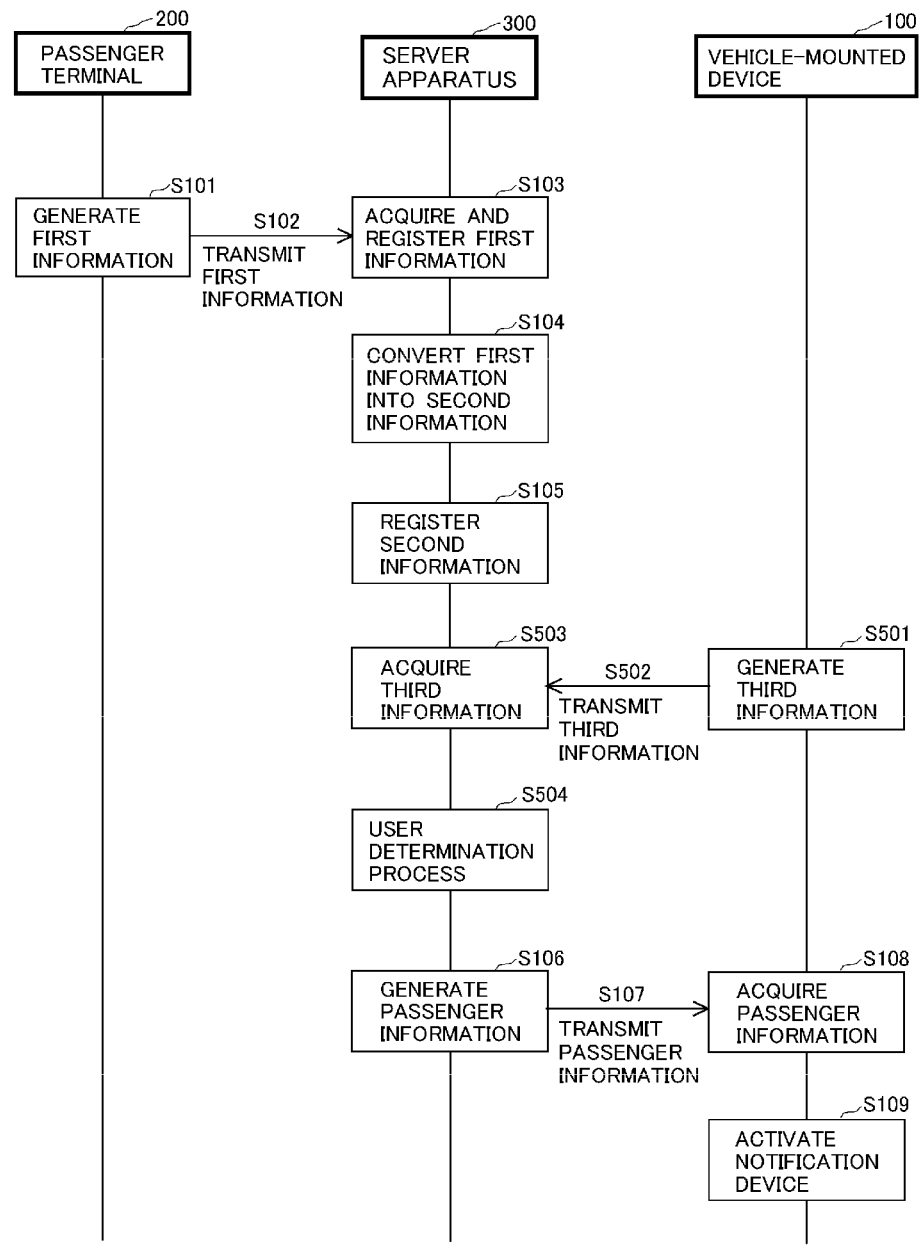
[Fig. 22]

INFORMATION PROCESSING APPARATUS, INFORMATION PROCESSING SYSTEM, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-110188, filed on Jun. 8, 2018, which is hereby incorporated by reference herein in its entirety.

BACKGROUND

Technical Field

The present disclosure relates to an information processing apparatus, an information processing system, an information processing method, and a non-transitory storage medium.

Description of the Related Art

Patent document 1 discloses a technique related to a car navigation system that includes position display means and supplementary information display means that receive the position of a customer of a taxi and supplementary information pertaining to the customer and display them on a map.

CITATION LIST

Patent Literature

Patent Literature 1: Japanese Patent Laid-Open No. 10-105889

SUMMARY

An object of the present disclosure is to provide an information processing apparatus, an information processing system, an information processing method, and a program that enable a driver of a vehicle to grasp easily a passenger having requested a ride in the vehicle during driving.

An information processing apparatus according to the present disclosure comprises a controller including at least one processor. The controller is configured to execute: acquiring first information that is information related to an appearance of a passenger having requested a ride in a vehicle being driven by a driver and is image information taken; and generating information related to the passenger by converting the first information into second information representing a predetermined characteristic part of the appearance of the passenger.

Furthermore, the present disclosure can be grasped from an aspect of an information processing system. For example, the present disclosure may be an information processing system that includes a vehicle, a passenger terminal of a passenger having requested a ride in the vehicle, and a server apparatus. The server apparatus may include a controller configured to execute: acquiring first information that is information related to an appearance of the passenger and is image information taken by the passenger terminal; generating information related to the passenger by converting the first information into second information representing a predetermined characteristic part of the appearance of the passenger; and transmitting the generated information related to the passenger to the vehicle. And the vehicle may include notification device configured to notify a driver driving the vehicle, of the received information related to the passenger.

Furthermore, the present disclosure can be grasped from an aspect of an information processing method. For example, the present disclosure may be an information processing method causing a computer to execute: a step of acquiring first information that is information related to an appearance of a passenger having requested a ride in a vehicle being driven by a driver and is image information taken; and a step of generating information related to the passenger by converting the first information into second information representing a predetermined characteristic part of the appearance of the passenger.

Furthermore, the present disclosure can be grasped from an aspect of an information processing program or a non-transitory storage medium stored with the information processing program. In this case, the information processing program may be configured to cause a computer to execute: a step of acquiring first information that is information related to an appearance of a passenger having requested a ride in a vehicle being driven by a driver and is image information taken; and a step of generating information related to the passenger by converting the first information into second information representing a predetermined characteristic part of the appearance of the passenger.

According to the present disclosure, the driver of the vehicle can more easily grasp a passenger having requested a ride in the vehicle during driving.

BRIEF DESCRIPTION OF DRAWINGS

FIG. 1 is a diagram for illustrating a rideshare;

FIG. 2 depicts a schematic configuration of a passenger information generating system according to an embodiment;

FIG. 3 is a diagram exemplifying hardware configurations of a vehicle, a passenger terminal, and a server apparatus according to a first embodiment;

FIG. 4 is a diagram exemplifying a functional configuration of the server apparatus according to the first embodiment;

FIG. 5 depicts an example of a management information table;

FIG. 6 depicts an example of a first information table;

FIG. 7 depicts an example of a second information table according to the first embodiment;

FIG. 8 is a diagram exemplifying a functional configuration of the passenger terminal according to the first embodiment;

FIG. 9 is a diagram exemplifying an image acquisition confirmation screen;

FIG. 10A is a first diagram exemplifying an image transmission confirmation screen;

FIG. 10B is a second diagram exemplifying the image transmission confirmation screen;

FIG. 10C is a third diagram exemplifying the image transmission confirmation screen;

FIG. 11 is a diagram exemplifying a functional configuration of a vehicle-mounted device according to the first embodiment;

FIG. 12 is a flowchart of processes of the server apparatus requesting transmission of first information after completion of a matching process;

FIG. 13 is a diagram exemplifying a flow of an operation of the passenger information generating system according to the first embodiment;

FIG. 14 is a diagram exemplifying a functional configuration of a vehicle-mounted device according to a modification example 1 of the first embodiment;

FIG. 15 is a diagram exemplifying a flow of an operation of the passenger information generating system according to the modification example 1 of the first embodiment;

FIG. 16 is a diagram exemplifying a functional configuration of the passenger terminal according to a modification example 2 of the first embodiment;

FIG. 17 is a diagram exemplifying a flow of an operation of the passenger information generating system according to the modification example 2 of the first embodiment;

FIG. 18 depicts an example of a second information table according to a second embodiment;

FIG. 19 is a diagram exemplifying a flow of an operation of a passenger information generating system according to a third embodiment;

FIG. 20 is a diagram exemplifying hardware configurations of a vehicle, a passenger terminal, and a server apparatus according to a fourth embodiment;

FIG. 21 is a diagram exemplifying a functional configuration of a server apparatus according to the fourth embodiment; and FIG. 22 is a first diagram exemplifying a flow of an operation of a passenger information generating system according to the fourth embodiment.

DESCRIPTION OF EMBODIMENTS

A controller of an information processing apparatus according to the present disclosure acquires first information. Here, the first information is image information where the appearance of a passenger having requested a ride in a vehicle that a driver is driving (hereinafter, sometimes simply called "passenger") has been taken. Accordingly, if the first information is provided for the driver of the vehicle, it is believed that the driver can easily grasp the passenger. However, if the first information is displayed on a car navigation output screen or the like during the driver's driving the vehicle, a situation that the driver gazes at the output screen can occur.

Accordingly, the controller converts the first information into second information, thereby generating information related to the passenger. Here, the second information is information that represents a predetermined characteristic part of the appearance of the passenger. Accordingly, the driver provided with the information generated by the controller can grasp the characteristic part of the appearance of the passenger, thereby allowing the driver to grasp easily the passenger during vehicle driving. That is, the information processing apparatus according to the present disclosure enables the driver of the vehicle to grasp more easily a passenger having requested a ride in the vehicle during driving.

Here, the second information is, for example, information allowed to be notified to the driver by audio. Accordingly, the driver provided with the information generated by the controller does not have to acquire the information related to the passenger while looking away from the front during vehicle driving. Accordingly, the passenger can be more easily grasped by the driver driving the vehicle.

Furthermore, the second information is image information related to the appearance of the passenger, and the predetermined characteristic part of the appearance of the passenger is a part except for a predetermined appearance part allowing the face of the passenger to be identified. Here, as for the appearance of a person, characteristics (e.g., clothes) other than the face are sometimes more prominent than the face. Accordingly, the driver provided with information generated by the controller can easily grasp the characteristic part of the appearance of the passenger. That is, the passenger can be more easily grasped by the driver driving the vehicle.

First Embodiment (Overview of Passenger Information Generating System)

An overview of a passenger information generating system according to this embodiment is described. FIG. 1 is a diagram for illustrating rideshare that is a traffic mode where users move while riding with each other. In FIG. 1, a user A moves from a departure point d to a destination point e, a user B moves from a departure point f to a destination point g, and a user C moves from a departure point h to a destination point e.

Here, if the users A to C separately move to the destination points, three vehicles are to be used. On the contrary, if the users A to C ride with each other, movement to the destinations is allowed by one vehicle. In an example depicted in FIG. 1, the user A serves as a driver of the vehicle, and moves the vehicle from the point d to the point e. In this case, the user A allows the user B to ride in his/her driving vehicle at the point f, and allows the user C to ride in his/her driving vehicle at the point h. The user A then passes through the point g at the middle of moving the vehicle to the point e, which is the destination point of him/her and the user C, and allows the user B to get off the vehicle at the point g, thereby enabling the user B to move from the departure point f to the destination point g. Furthermore, the user A moves the vehicle to the point e, which can move the user C from the departure point h to the destination point e and complete his/her movement.

Such rideshare can reduce the number of vehicles traveling on roads, which can reduce traffic jams. Furthermore, for example, the transportation cost (including the fuel cost etc.) used for movement using a vehicle is shared and afforded (cost sharing) among the users of the vehicle, thereby allowing the transportation cost per user to be reduced in comparison with a case where the users separately move in different vehicles.

The mode of the rideshare depicted in FIG. 1 is only one example. In this embodiment, users matched up with each other using a publicly known technique ride together, thereby allowing rideshare to be achieved. Here, matching is setting of a combination of users allowed to ride with each other in the same vehicle. Note that as described later, a combination of the vehicle and passengers may be set by matching.

Here, in the rideshare, users who are strangers to each other sometimes ride with each other. Accordingly, for example, even if a meeting point of users is predetermined but there are multiple passersby around the meeting point, it is difficult for the user driving the vehicle provided for rideshare (this user is hereinafter called "driver") to identify the user having requested a ride in the vehicle (this user is hereinafter called "passenger") among multiple passersby. Note that such a situation can occur also in a case where the driver of a taxi meets a customer having a reservation for the taxi at a predetermined meeting point.

On the other hand, conventionally, a technique has been known that displays position information on the customer having the reservation for the taxi and supplementary information pertaining to the customer, on a map on a car navigation system provided for the taxi. However, for example, when the driver of the taxi identifies the customer among multiple passersby using the conventional technique while driving the vehicle, a situation can occur where the driver gazes at a map screen of the car navigation system.

In the passenger information generating system according to this embodiment, a server apparatus acquires first information that is information related to the appearance of the passenger and is image information taken. The server apparatus then generates information related to the passenger by converting the first information into second information representing a predetermined characteristic part of the appearance of the passenger. Note that in this embodiment, the second information is information allowed to be notified to the driver by audio. Accordingly, as the driver does not have to acquire the information related to the passenger while looking away from the front during vehicle driving, the driver can more easily grasp the passenger during vehicle driving.

(System Configuration)

FIG. 2 is a diagram depicting the schematic configuration of the passenger information generating system according to this embodiment. In the example in FIG. 2, the passenger information generating system 1 includes a vehicle 10, a vehicle-mounted device 100 installed in the vehicle 10, a passenger terminal 200 that is a terminal that the passenger has, and a server apparatus 300. The vehicle-mounted device 100, the passenger terminal 200, and the server apparatus 300 are connected to each other by a network N1.

The server apparatus 300 accepts a registration of information from the user who uses rideshare. Identification information related to the user and information on the vehicle provided for rideshare are registered in the server apparatus 300. The user (passenger) requesting a ride in any vehicle registered in the server apparatus 300 can register information indicating a request for a ride (hereinafter, request information) using the passenger terminal 200. Note that the passenger can register the request information through an application installed in the passenger terminal 200 for using a rideshare service (hereinafter, sometimes called "predetermined application"), for example. However, there is no intention of limitation to the mode of registering the request information using the passenger terminal 200. The request information may be registered using any terminal connectable to the network N1 (a smartphone, a mobile phone, a tablet terminal, a personal information terminal, a wearable computer or the like) or a personal computer (PC). The identification information related to the user, and the information on the vehicle provided for rideshare are preliminarily registered by the predetermined application. When the passenger registers the request information using the predetermined application, user authentication is preliminarily performed using a password or the like before registration of the request information.

Upon acceptance of registration of the request information issued by the passenger, the server apparatus 300 matches up the passenger with the vehicle. In the example in FIG. 2, the vehicle 10 is selected as the vehicle in which the passenger is to ride, from among the vehicles registered in the server apparatus 300. Here, the server apparatus 300 can match up the passenger with the vehicle using the publicly known technique. In detail, the pieces of information on the vehicles registered in the server apparatus 300 are associated with the respective pieces of identification information related to the users (owners) who own the vehicles. For each vehicle provided for rideshare, a traveling schedule of the vehicle is preliminarily registered in the server apparatus 300 by the owner of the vehicle. For example, the server apparatus 300 can match up the passenger with the vehicle on the basis of the movement schedule of the passenger and of the traveling schedule of the vehicle registered in the server apparatus 300. The movement schedule of the passenger can be included in the request information issued by the passenger.

The server apparatus 300 completes the matching process described above, and then notifies the passenger of predetermined information pertaining to rideshare (for example, transmission to the passenger terminal 200). Here, the predetermined information is, for example, information related to the vehicle 10 (the vehicle type, color, vehicle number, etc.), information related to the driver of the vehicle 10 (the gender, age, etc.), information related to movement (the meeting point and meeting time with the vehicle 10, the movement path, the scheduled arrival time to the destination point, the presence or absence of another passenger, the cost for movement, etc.). The server apparatus 300 notifies the user who owns (drives) the vehicle 10, of information on the gender and age of the passenger, the meeting point, meeting time, destination point, etc. that the passenger desires. Each of users having acquired the information (the driver and the passenger) approves the matching, thereby determining the matching between the passenger and the vehicle 10.

Besides the function described above, in the passenger information generating system according to this embodiment, the aforementioned first information (that is information related to the appearance of the passenger and is image information taken) is transmitted from the passenger terminal 200 to the server apparatus 300. In this embodiment, the first information is passenger appearance image information taken by a camera included in the passenger terminal 200, and is image information that contains the clothes of the passenger when this passenger actually rides in the vehicle 10. The server apparatus 300, having received the first information, converts the first information into the aforementioned second information (information representing the predetermined characteristic part of the appearance of the passenger), thereby generating the information related to the passenger (hereinafter, sometimes called "passenger information"). As described above, in this embodiment, the second information is information allowed to be notified to the driver by audio and is, for example, audio information or text information. The server apparatus 300 then transmits the generated passenger information to the vehicle 10. Accordingly, in this embodiment, the vehicle-mounted device 100 included in the vehicle 10 receives the passenger information, and the passenger information is notified to the driver through a speaker (notification device) included in the vehicle 10. The driver's terminal disposed in the vehicle 10 may receive the passenger information. In this case, the passenger information is notified to the driver through a speaker (notification device) that the terminal includes. The details of the flow of these processes are described later.

(Hardware Configurations)

FIG. 3 is a diagram exemplifying hardware configurations of the vehicle 10, the passenger terminal 200, and the server apparatus 300.

First, the server apparatus 300 is described. The server apparatus 300 has the configuration of a typical computer. The server apparatus 300 includes a processor 301, a main memory unit 302, an auxiliary memory unit 303, and a communication unit 304. These are connected to each other by a bus. The main memory unit 302 and the auxiliary memory unit 303 are computer-readable storage media. The hardware configuration of the computer is not limited to the example depicted in FIG. 3. The components may be appropriately omitted replaced or added.

The server apparatus 300 causes the processor 301 to load a program stored in the storage medium into a work area of the main memory unit 302 and execute the program, and to control each functional component and the like through execution of the program, thereby allowing a function satisfying a predetermined object to be achieved.

The processor 301 is, for example, a CPU (Central Processing Unit) or a DSP (Digital Signal Processor). The processor 301 controls the server apparatus 300 to perform the operation of various information processes. The main memory unit 302 includes, for example, a RAM (Random Access Memory) and a ROM (Read Only Memory). The auxiliary memory unit 303 is, for example, an EPROM (Erasable Programmable ROM), or a hard disk drive (HDD). The auxiliary memory unit 303 may include a removable medium, i.e., a removable storage medium. The removable medium is, for example, a disk storage medium, such as a USB (Universal Serial Bus) memory or a CD (Compact Disc) or a DVD (Digital Versatile Disc).

The auxiliary memory unit 303 stores various programs, various data items and various tables, in the storage medium, in a readable and writable manner. The auxiliary memory unit 303 stores an operating system (OS), various programs, various tables, etc. The information stored in the auxiliary memory unit 303 may be stored in the main memory unit 302. Furthermore, the information stored in the main memory unit 302 may be stored in the auxiliary memory unit 303.

The communication unit 304 is connected to another apparatus, and controls communication between the server apparatus 300 and the other apparatus. The communication unit 304 is, for example, a LAN (Local Area Network) interface board, or a wireless communication circuit for wireless communication. The LAN interface board or the wireless communication circuit is connected to the network N1, such as the Internet, which is a public communication network.

A series of processes executed by the server apparatus 300 can be executed by hardware, but can be executed by software instead.

Next, the passenger terminal 200 is described. The passenger terminal 200 is, for example, a small computer, such as a smartphone, a mobile phone, a tablet terminal, a personal information terminal, or a wearable computer (a smartwatch etc.). Note that the passenger terminal 200 may be a personal computer (PC) that is connected to the server apparatus 300 via the network N1, such as the Internet, which is a public communication network.

The passenger terminal 200 includes a processor 201, a main memory unit 202, an auxiliary memory unit 203, a display unit 204, an input unit 205, and a communication unit 206. The processor 201, the main memory unit 202, and the auxiliary memory unit 203 are analogous to the processor 301, the main memory unit 302, and the auxiliary memory unit 303 of the server apparatus 300. Accordingly, the description thereof is omitted. The display unit 204 is, for example, a liquid crystal display (LCD), an Electroluminescence (EL) panel or the like. The input unit 205 includes a touch panel, push buttons, etc. Furthermore, the input unit 205 includes a camera allowing videos and images to be input. Furthermore, the input unit 205 may include an audio input unit, such as a microphone. The communication unit 206 is, for example, a communication circuit for accessing the network N1 using a mobile communication service (a telephone communication network, such as of mobile phones, or wireless communication, such as WiFi) and for communicating with the server apparatus 300 and the like.

Next, the vehicle 10 is described. The vehicle 10 includes the vehicle-mounted device 100, and notification device 110. Furthermore, the vehicle-mounted device 100 includes a processing unit 101, and a communication unit 102.

The processing unit 101 is a computer that controls notification about the passenger information to the driver of the vehicle 10. The processing unit 101 is made up of a microcomputer, for example. For control by the processing unit 101, a predetermined functional component is controlled. This functional component can be achieved by executing a program stored in memory, such as a ROM (Read Only Memory), by a CPU (Central Processing Unit).

The communication unit 102 is, for example, a communication circuit for accessing the network N1 using a mobile communication service and for communicating with the server apparatus 300 and the like. The vehicle 10 is connected to the network N1 by the communication unit 102. Information acquired by the communication unit 102 is transmitted to the processing unit 101.

The notification device 110 has a configuration for notifying the driver of the passenger information, and is a speaker in this embodiment. The operation of the notification device 110 is controlled by the processing unit 101.

The network N1 is, for example, a worldwide public communication network, such as the Internet. A WAN (Wide Area Network) or another communication network may be adopted. The network N1 may include a telephone communication network such as of mobile phones, and a wireless communication network such as WiFi.

(Functional Configuration of Server Apparatus)

FIG. 4 is a diagram exemplifying a functional configuration of the server apparatus 300. The server apparatus 300 includes, as functional components: a reservation processing unit F310; a first information acquisition unit F320; a passenger information generating unit F330; a passenger information providing unit F340; a use management database D310; a first information database D320; and a second information database D330. The reservation processing unit F310 includes a matching processing unit F311. The passenger information generating unit F330 includes an information conversion unit F331. The processor 301 of the server apparatus 300 causes a computer program on the main memory unit 302 to execute the processes of the reservation processing unit F310, the matching processing unit F311, the first information acquisition unit F320, the passenger information generating unit F330, the information conversion unit F331, and the passenger information providing unit F340. Note that any of the functional components or a part of the process thereof may be executed by a hardware circuit.

The use management database D310, the first information database D320, and the second information database D330 are constructed through management of data stored in the auxiliary memory unit 303, the management being performed by a program of a database management system (DBMS) executed by the processor 301. The use management database D310, the first information database D320, and the second information database D330 are, for example, relational databases.

Note that any of the functional components of the server apparatus 300 or a part of the process thereof may be executed by another computer connected to the network N1. For example, each process included in the reservation processing unit F310, and the processes of the first information acquisition unit F320, the passenger information generating unit F330, the information conversion unit F331 and the passenger information providing unit F340 may be executed by different computers.

The reservation processing unit F310 acquires request information issued by a user having requested a ride in any vehicle registered in the server apparatus 300. The matching processing unit F311 included in the reservation processing unit F310 then performs a matching process between the passenger and the vehicle. The matching processing unit F311 can match up the passenger with the vehicle using the publicly known technique. After completion of the process by the matching processing unit F311, the reservation processing unit F310 requests each user (the driver and the passenger) to approve the matching, as described above. After approval of the matching determines the matching between the passenger and the vehicle 10, the reservation processing unit F310 generates information related to rideshare use management (use management information), and registers it in the use management database D310.

Here, the use management database D310 is a database that stores the use management information. The use management database D310 includes a management information table depicted in FIG. 5. Note that information stored in the management information table is not limited to the example depicted in FIG. 5. A field can be appropriately added, changed and removed.

The management information table depicted in FIG. 5 has the fields of a driver ID, a passenger ID, a vehicle number, a point where the passenger is scheduled to meet the vehicle 10 (scheduled meeting point), a time when the passenger is scheduled to meet the vehicle 10 (scheduled meeting time), a destination point of the passenger, and a arrival time desired by the passenger (desired arrival time). The driver ID is an ID for identifying the driver. The passenger ID is an ID for identifying the passenger. The vehicle number is identification information for identifying the vehicle 10. Here, the driver ID is preliminarily associated with the identification information (vehicle number) on the vehicle 10 in the server apparatus 300. Rideshare user information that includes the driver ID and the passenger ID is managed by an individual table. The table includes the user's contact destination and the like. The contact destination is, for example, the user's mobile phone number or email address.

The scheduled meeting point, the scheduled meeting time, the destination point of the passenger, and the desired arrival time are information set by the matching processing unit F311 and approved by each user. In the example depicted in FIG. 5, a passenger C001 meets the vehicle 10 driven by a driver S001 at 8:00 at a point f. The driver S001 then moves the vehicle 10 toward a destination point g. Furthermore, in the example depicted in FIG. 5, a passenger C002 meets the vehicle 10 driven by a driver S002 at 8:30 at a point h. The driver S002 then moves the vehicle 10 toward a point i, and further allows a passenger C003 to ride at 8:45 at the point i. The driver S002 then moves the vehicle 10 toward a destination point j of the passenger C003, lets the passenger C003 get off at the point j, and subsequently moves the vehicle 10 toward a destination point e of the passenger C002.

Here, returning to the description of FIG. 4. For generation of the passenger information in the server apparatus 300, first, the first information acquisition unit F320 acquires the first information transmitted from the passenger terminal 200. The first information acquisition unit F320 acquires the first information transmitted from the passenger terminal 200, through reception by the communication unit 304. Note that the first information acquisition unit F320 may communicate with the passenger terminal 200 via the communication unit 304 at predetermined timing, and urge that the passenger transmit the first information. Upon acquisition of the first information, the first information acquisition unit F320 then registers the first information in the first information database D320.

Here, the first information database D320 is a database that stores the first information. The first information database D320 includes a first information table depicted in FIG. 6. Note that information stored in the first information table is not limited to the example depicted in FIG. 6. A field can be appropriately added, changed and removed.

The first information table depicted in FIG. 6 includes the fields of the passenger ID, the first information, the driver ID, the vehicle number, and the scheduled meeting time. As depicted in FIG. 6, the first information transmitted from the passenger terminal 200 is associated with the passenger ID and is stored in the first information table. Furthermore, the first information is associated with information pertaining to the vehicle 10 where the passenger is scheduled to ride (in the example depicted in FIG. 6, the driver ID, the vehicle number, and the scheduled meeting time).

Next, the information conversion unit F331 included in the passenger information generating unit F330 depicted in FIG. 4 converts the first information into the second information, thereby generating the passenger information. In this embodiment, the first information, which is image information taken, is converted into the second information allowed to be notified to the driver of the vehicle 10 by audio (audio information, text information, etc.). This is hereinafter described based on FIG. 7. Note that the processor 301 executes the processes of the first information acquisition unit F320, the passenger information generating unit F330, and the information conversion unit F331, thereby functioning as a controller according to the present disclosure. The server apparatus 300 then functions as an information processing apparatus according to the present disclosure.

FIG. 7 is a diagram depicting a second information table included in the second information database D330. The information conversion unit F331 converts the first information into the second information, then registers the second information in the second information database D330, and generates the second information table exemplified in FIG. 7. Note that the information stored in the second information table is not limited to the example depicted in FIG. 7. A field can be appropriately added, changed and removed.

The second information table depicted in FIG. 7 includes the fields of the passenger ID, the second information, the driver ID, the vehicle number, and the scheduled meeting time. Here, as described above, the second information is information representing the predetermined characteristic part of the appearance of the passenger and is, for example, information related to the gender, body shape and clothes of the passenger. The information conversion unit F331 applies a publicly known image analysis process to the first information, thereby enabling the first information to be converted into such pieces of information. For example, the information conversion unit F331 may extract information related to the gender, body shape and clothes from the first information by geometrically comparing a template in which information related to the appearances of people (including clothes) are standardized and which is information stored in any database, with the first information, or extract the information related to the gender, body shape and clothes from the first information by statistically quantifying the first information. Note that the second information may be text information as depicted in FIG. 7, or audio information acquired by converting the text information into audio.

As depicted in FIG. 7, for example, the age and gender, which are the predetermined characteristic parts of the appearance of the passenger having a passenger ID of C001, are twenties and male. Furthermore, the second information table stores information related to the height and clothes of the passenger as other characteristic parts.

Note that the passenger information generating unit F330 may generate the passenger information by including additional information and the like into the second information, into which the information conversion unit F331 have converted the first information. In this case, the passenger information generating unit F330 may include predetermined functional components other than the information conversion unit F331.

The passenger information is provided for the vehicle 10 by the passenger information providing unit F340 depicted in FIG. 4. As depicted in FIG. 7, the second information table stores information pertaining to the vehicle 10 where the passenger is scheduled to ride (in the example depicted in FIG. 7, the driver ID, the vehicle number, and the scheduled meeting time). Accordingly, the passenger information providing unit F340 can transmit the passenger information to the vehicle 10 via the communication unit 304 at any timing before the scheduled meeting time on the basis of the information stored in the second information table.

(Functional Configuration of Passenger Terminal)

FIG. 8 is a diagram exemplifying a functional configuration of the passenger terminal 200. The passenger terminal 200 includes, as functional components: a reservation registration unit F210; and a first information generating unit F220. The processor 201 of the passenger terminal 200 executes the processes of the reservation registration unit F210 and the first information generating unit F220, through a computer program on the main memory unit 202. Note that any of the functional components or a part of the process thereof may be executed by a hardware circuit.

The reservation registration unit F210 accepts input of request information issued by the user requesting a ride in any vehicle registered in the server apparatus 300, and transmits the input information to the server apparatus 300. Such a function by the reservation registration unit F210 is achieved by a predetermined application.

The first information generating unit F220 generates the first information by obtaining an image of the appearance of the passenger. This is hereinafter described in detail.

FIG. 9 is a diagram exemplifying an image acquisition confirmation screen. An image acquisition confirmation screen SC1 is a screen for confirming imaging of the cloths of the passenger, and is provided by a predetermined application. The image acquisition confirmation screen SC1 indicates passenger identification information SC11 (ID and name), a place (scheduled meeting point) SC12, a time (scheduled meeting time) SC13, and a confirmation button SC14 to which a label "Next" is added.

The passenger identification information SC11 (ID and name) is a field for displaying the passenger identification information. The passenger identification information is preliminarily registered by a predetermined application. The place SC12 and the time SC13 are information that is on the scheduled meeting point and the scheduled meeting time and is stored in the management information table depicted in FIG. 5 described above. A predetermined application accesses the use management database D310 of the server apparatus 300, thereby displaying the information on the image acquisition confirmation screen SC1. The confirmation button SC14 is an operation button that activates a camera for taking an image of the clothes of the passenger (the camera is included in the input unit 205 of the passenger terminal 200). When the confirmation button SC14 is pressed, the first information generating unit F220 activates the camera, thus enabling an image of the clothes of the passenger to be taken.

Upon acquisition of the image of the appearance of the passenger, the first information generating unit F220 then transmits the acquired image to the server apparatus 300. FIGS. 10A to 10C are diagrams exemplifying an image transmission confirmation screen. The image transmission confirmation screen SC2 is a screen for confirming transmission of the image on the passenger taken by the camera, and is provided by a predetermined application. The image transmission confirmation screen SC2 indicates passenger information SC21 (ID and name), an image SC22, a transmission button SC23 to which a label "Yes" is added, and a cancel button SC24 to which a label "No" is added.

The image SC22 is image information that is on the appearance of the passenger and has been taken by the camera. The passenger can verify the image SC22 and determine whether to transmit the image to the server apparatus 300 or not. When the transmission button SC23 is pressed, the first information generating unit F220 transmits the first information to the server apparatus 300 via the communication unit 206. On the other hand, when the cancel button SC24 is pressed, the first information generating unit F220 reactivates the camera, thus enabling an image of the clothes of the passenger to be taken.

Note that the image SC22 depicted in FIG. 10A is an image where the entire body of the passenger is taken. However, there is no intention of limitation thereto. The image displayed on the image transmission confirmation screen SC2 may be an image SC221 where an upper garment and a lower garment of the passenger are taken as depicted in FIG. 10B, or an image SC222 where the head and the upper garment of the passenger are taken as depicted in FIG. 10C.

(Functional Configuration of Vehicle-Mounted Device)

FIG. 11 is a diagram exemplifying the functional configuration of the vehicle-mounted device 100. The vehicle-mounted device 100 includes as functional components: a passenger information acquisition unit F110; and an operation control unit F140. A CPU of the vehicle-mounted device 100 executes the processes of the passenger information acquisition unit F110 and the operation control unit F140, through a computer program stored in memory, such as a ROM. Note that any of the functional components or a part of the process thereof may be executed by a hardware circuit.

The passenger information acquisition unit F110 acquires the passenger information transmitted from the server apparatus 300, through reception by the communication unit 102. Note that upon acquisition of the passenger information, the passenger information acquisition unit F110 may register the passenger information in any database included in the vehicle-mounted device 100.

The operation control unit F140 controls notification about the passenger information to the driver of the vehicle 10. In detail, the operation control unit F140 controls the operation of the notification device 110, thereby controlling the notification about the passenger information to the driver of the vehicle 10. Accordingly, the passenger information can be notified to the driver at appropriate timing.

(Flow of Processes)

The flow of operation of the passenger information generating system according to this embodiment is described. In this embodiment, when matching between the passenger and the vehicle 10 is completed by the process executed by the matching processing unit F311 of the server apparatus 300, the first information acquisition unit F320 of the server apparatus 300 communicates with the passenger terminal 200 via the communication unit 304 at predetermined timing, and urges that the passenger transmit the first information. This is described based on FIG. 12.

FIG. 12 is a flowchart of the processes of the server apparatus 300 requesting transmission of the first information after completion of the matching process. According to the processes, after completion of the matching, that is, after determination of matching between the passenger and the vehicle 10, first, in step S301, the reservation processing unit F310 generates information (use management information) related to rideshare use management, and registers it in the use management database D310.

Next, in step S302, the first information acquisition unit F320 acquires the current time. In step S303, it is determined whether the acquired current time is after the predetermined time or not. Here, the first information in this embodiment is image information that contains the clothes of the passenger in a case where the passenger actually rides in the vehicle 10. Consequently, the predetermined time is defined as time when such image information can be acquired. For example, the predetermined time is 30 minutes before the scheduled meeting time. If an affirmative determination is made in step S303, the first information acquisition unit F320 proceeds to the process in step S304. If a negative determination is made in step S303, the first information acquisition unit F320 returns to the process in step S302.

If the affirmative determination is made in step S303, in subsequent step S304 the first information acquisition unit F320 then communicates with the passenger terminal 200 via the communication unit 304, thereby requesting transmission of the first information. After the process in step S304, the execution of this flow is finished.

According to the processing flow described above, transmission of the first information can be requested at timing suitable for acquisition of the first information, which includes the clothes of the passenger at the time when the passenger actually rides in the vehicle 10. Accordingly, as described later, the driver driving the vehicle 10 can relatively easily determine the passenger among the passersby at the scheduled meeting point.

Furthermore, FIG. 13 is a diagram exemplifying the flow of the operation of the passenger information generating system according to this embodiment. FIG. 13 illustrates the flow of the operation between the components, and the process executed by each component, in the passenger information generating system 1. Note that in this embodiment, the processes depicted in FIG. 13 are executed after completion of execution of the flow depicted in FIG. 12 described above.

Upon receipt of a first information transmission request issued by the server apparatus 300, the passenger terminal 200 notifies the passenger of this. The passenger can then activate the camera of the passenger terminal 200 through the image acquisition confirmation screen SC1 depicted in FIG. 9 described above, and can take an image of the own appearance. Accordingly, the first information is generated (S101). Furthermore, the passenger can transmit the first information through the image transmission confirmation screen SC2 depicted in FIGS. 10A to 10C to the server apparatus 300 (S102).

The server apparatus 300 acquires the first information transmitted from the passenger terminal 200, through reception by the communication unit 304, and registers the first information in the first information database D320 (S103).

The server apparatus 300 then converts the first information into the second information (S104), and registers the second information in the second information database D330 (S105). Furthermore, the server apparatus 300 generates the passenger information on the basis of the second information registered in the second information database D330 (S106). Note that the passenger information may be the same as the second information, the second information to which predetermined processing procedures have been applied, or the second information to which predetermined information has been added. The server apparatus 300 then transmits the passenger information to the vehicle-mounted device 100 (S107).

The vehicle-mounted device 100 acquires the passenger information transmitted from the server apparatus 300, through reception by the communication unit 102 (S108). The vehicle-mounted device 100 then activates the notification device 110 (here, the speaker included in the vehicle 10) (S109), and notifies the passenger information to the driver of the vehicle 10. Note that in a case where the second information is text information as depicted in FIG. 7 described above and the passenger information transmitted from the server apparatus 300 is also text information, the vehicle-mounted device 100 converts the text information into audio information. As described above, the vehicle-mounted device 100 may correct the passenger information transmitted from the server apparatus 300 and notifies the driver of this information.

In this embodiment, the passenger information is notified to the driver by audio as described above. Accordingly, the driver driving the vehicle 10 can determine the passenger among the passersby at the scheduled meeting point on the basis of the notified audio information. Note that in this embodiment, the passenger information is generated by converting the first information, which includes the clothes of the passenger at the time when the passenger actually rides in the vehicle 10, into the second information. Consequently, the driver of the vehicle 10 can relatively easily determine the passenger.

Furthermore, in this embodiment, the first information that is image information is converted by the server apparatus 300 into the second information allowed to be notified by audio. Accordingly, what is performed by the passenger is only to take an image of the own appearance using the passenger terminal 200 and to transmit it to the server apparatus 300. That is, the passenger information can be preferably generated while reducing the efforts of the passenger.

According to the passenger information generating system described above, the driver of the vehicle 10 does not have to acquire the information related to the passenger while looking away from the front during driving the vehicle 10. Accordingly, the passenger can be more easily grasped by the driver driving the vehicle 10. That is, the passenger information generating system according to this embodiment enables the driver of the vehicle to grasp more easily a passenger having requested a ride in the vehicle during driving.

Each process depicted in FIG. 13 described above is executed after execution of the flow depicted in FIG. 12 described above is finished. However, this embodiment has no intention of limitation thereto. At any timing before riding in the vehicle 10, the passenger may activate a predetermined application of the passenger terminal 200, and perform an operation of generating the first information.

(Storage Medium)

A program that allows a computer, another machine or an apparatus (hereinafter a computer or the like) to achieve any of the functions described above can be stored in a storage medium that is readable by the computer or the like. The computer or the like is caused to read and perform the program in the storage medium, thereby enabling the function to be provided.

Here, the storage medium that is readable by the computer or the like is a non-transitory storage medium that can accumulate information, such as data or programs, through an electric, a magnetic, an optical, a mechanical or a chemical action, and read it from the computer or the like. What is detachable from the computer or the like among such storage media includes, for example, a flexible disk, magnetooptical disk, CD-ROM, CD-R/W, DVD, blu-ray disk, DAT, 8 mm tape, and a memory card, such as a flash memory. Furthermore, there is a hard disk, ROM (read only memory) and the like as storage media fixed to the computer or the like. Moreover, an SSD (Solid State Drive) can be used as a storage medium detachable from the computer or the like and also as a storage medium fixed to the computer or the like.

Modification Example 1 of First Embodiment

Next, a modification example 1 of the aforementioned first embodiment described above is described. Note that in this modification example, detailed description of components substantially identical to those in the first embodiment and substantially identical control processes is omitted.

In the first embodiment described above, as depicted in FIG. 13, the server apparatus 300 acquires the first information (S103 in FIG. 13), and converts the acquired first information into the second information, thereby generating the passenger information (S104 to S106 in FIG. 13). Meanwhile, in this modification example, the vehicle-mounted device 100 acquires the first information, and converts the acquired first information into the second information. This is described based on FIGS. 14 and 15.

FIG. 14 is a diagram exemplifying the functional configuration of the vehicle-mounted device 100 according to this modification example. The vehicle-mounted device 100 includes as functional components: a first information acquisition unit F120; a passenger information generating unit F130; and an operation control unit F140. The passenger information generating unit F130 includes an information conversion unit F131. Note that processes executed by the first information acquisition unit F120, the passenger information generating unit F130 and the information conversion unit F131 are substantially identical to the processes executed by the first information acquisition unit F320, the passenger information generating unit F330 and the information conversion unit F331, which are described in the first embodiment. Note that in this modification example, the first information acquisition unit F120 acquires, from the server apparatus 300, the first information transmitted from the passenger terminal 200 and stored in the server apparatus 300. Furthermore, the CPU executes the processes of the first information acquisition unit F120, the passenger information generating unit F130 and the information conversion unit F131, thereby functioning as the controller according to the present disclosure. The vehicle-mounted device 100 then functions as the information processing apparatus according to the present disclosure.

FIG. 15 is a diagram exemplifying the flow of the operation of the passenger information generating system according to this modification example. In this modification example, the vehicle-mounted device 100 acquires the first information transmitted from the server apparatus 300 (S202), through reception by the communication unit 102 (S203). The vehicle-mounted device 100 then converts the first information into the second information (S204), and registers the second information in a predetermined database (S205). Furthermore, the vehicle-mounted device 100 generates the passenger information on the basis of the second information (S206).

Also according to the passenger information generating system described above, the passenger can be more easily grasped by the driver driving the vehicle 10.

Modification Example 2 of First Embodiment

Next, a modification example 2 of the aforementioned first embodiment is described. Note that in this modification example, detailed description of components substantially identical to those in the first embodiment and substantially identical control processes is omitted.

In the first embodiment described above, as depicted in FIG. 13, the server apparatus 300 acquires the first information (S103 in FIG. 13), and converts the acquired first information into the second information, thereby generating the passenger information (S104 to S106 in FIG. 13). Meanwhile, in this modification example, the passenger terminal 200 generates and acquires the first information, and converts the first information into the second information. This is described based on FIGS. 16 and 17.

FIG. 16 is a diagram exemplifying the functional configuration of the passenger terminal 200 according to this modification example. The passenger terminal 200 includes, as functional components: a reservation registration unit F210; a first information generating unit F220; and a passenger information generating unit F230. Here, the first information generating unit F220 acquires the first information by generating the first information. The passenger information generating unit F230 includes an information conversion unit F231. Note that processes executed by the passenger information generating unit F230 and the information conversion unit F231 are substantially identical to the processes executed by the passenger information generating unit F330 and the information conversion unit F331, which are described in the first embodiment. Note that the processor 201 executes the processes of the first information generating unit F220, the passenger information generating unit F230 and the information conversion unit F231, thereby functioning as the controller according to the present disclosure. The passenger terminal 200 then functions as the information processing apparatus according to the present disclosure.

FIG. 17 is a diagram exemplifying the flow of the operation of the passenger information generating system according to this modification example. In this modification example, the first information is generated by the first information generating unit F220 (S101) to thereby acquire the first information.

The passenger terminal 200 then converts the first information into the second information (S304), and registers the second information in a predetermined database (S305). Furthermore, the passenger terminal 200 generates the passenger information on the basis of the second information (S306), and transmits the passenger information to the server apparatus 300 (S307).

The server apparatus 300 acquires the passenger information transmitted from the passenger terminal 200, through reception by the communication unit 304 (S308). The server apparatus 300 then transmits the passenger information to the vehicle-mounted device 100 (S309).

The vehicle-mounted device 100 acquires the passenger information transmitted from the server apparatus 300, through reception by the communication unit 102 (S108). The vehicle-mounted device 100 then activates the notification device 110 (here, the speaker included in the vehicle 10) (S109), and notifies the passenger information to the driver of the vehicle 10.

Also according to the passenger information generating system described above, the passenger can be more easily grasped by the driver driving the vehicle 10.

Second Embodiment

Next, a second embodiment of the present disclosure is described. Note that in this embodiment, detailed description of components substantially identical to those in the aforementioned first embodiment and substantially identical control processes is omitted.

According to the present disclosure, as described in the first embodiment, what is performed by the passenger is only to take the own appearance using the passenger terminal 200 and to transmit it as the first information to the server apparatus 300. It may be believed that use of such first information can provide the passenger information for the driver of the vehicle 10 while reducing the efforts of the passenger.

However, as for the appearance of a person, characteristics (e.g., clothes) other than the face are sometimes more prominent than the face. Consequently, for providing the information about the passenger of the driver of the vehicle 10, the passenger can be more easily grasped by the driver driving the vehicle 10 by notifying a prominent part in the appearance of the passenger with the part being emphasized as a characteristic part than by notifying the first information as it is.

In a case where there is relatively much information that is related to the passenger and is to be notified to the driver of the vehicle 10 (such information is, for example, image information where the entire body of the passenger is taken in detail), the characteristic part of the appearance of the passenger is sometimes difficult to be prominent. Meanwhile, for example, the characteristic part of the appearance of the passenger becomes likely to be prominent by removing predetermined information from the image information where the appearance of the passenger has been taken.

Furthermore, the first information, which is the image information where the appearance of the passenger has been taken, can contain predetermined information allowing the face of the passenger to be identified (for example, image information on the entire face of the passenger). Accordingly, provision of the first information to the driver of the vehicle 10 is unfavorable for the passenger who does not wish that the own face information is transmitted to the vehicle 10 owned by another person.

Accordingly, in the passenger information generating system according to this embodiment, the server apparatus 300 converts the first information into the second information, thereby generating the passenger information. Note that in this embodiment, the second information is image information related to the appearance of the passenger. The predetermined characteristic part of the appearance of the passenger represented by the second information is a part except for a predetermined appearance part allowing the face of the passenger to be identified. The second information has a smaller amount of information than the first information has. This is described based on FIG. 18.

FIG. 18 is a diagram depicting a second information table according to this embodiment. This second information table is included in the second information database D330 of the server apparatus 300. Note that information stored in the second information table is not limited to the example depicted in FIG. 18. A field can be appropriately added, changed and removed.

The second information table depicted in FIG. 18 includes the fields of the passenger ID, the second information, the driver ID, the vehicle number, and the scheduled meeting time. Here, for converting the first information into the second information, the information conversion unit F331 of the server apparatus 300 executes a process of removing, from the first information, the predetermined information allowing the face of the passenger to be identified, thereby generating the second information to be stored in the second information table. In detail, the information conversion unit F331 applies a publicly known image analysis process to the first information, thereby identifying the passenger face information. When it is determined that the passenger can be identified from the face information, a predetermined process described later is applied to this face information, thereby converting the first information into the second information. Here, for example, if the face information includes eyes, a nose and a mouth, the information conversion unit F331 can determine that the passenger can be identified from the face information.

The second information in this embodiment is image information where a mosaic process has been applied to the entire face of the passenger as exemplified in FIG. 18. However, this embodiment has no intention of limiting the second information thereto. The second information may be image information where the mosaic process has been applied not to the entire face of the passenger but only to the eyes, mouth and the like, or other image information where information allowing the face of the passenger to be identified has been removed.

As described in the first embodiment, the server apparatus 300 generates the passenger information on the basis of the second information, and transmits the passenger information to the vehicle-mounted device 100. The vehicle-mounted device 100 having received the passenger information activates the notification device 110 to notify the passenger information to the driver of the vehicle 10. Note that the notification device 110 in this embodiment is an output screen of a navigation system provided for the vehicle 10, for example.

The passenger information generating system described above allows the driver of the vehicle 10 to grasp easily the characteristic part of the appearance of the passenger. Accordingly, the passenger can be more easily grasped by the driver driving the vehicle 10. That is, the passenger information generating system according to this embodiment enables the driver of the vehicle to grasp more easily a passenger having requested a ride in the vehicle during driving. Furthermore, the passenger information generating system described above can notify the driver of the information related to the passenger without transmitting the face information allowing the passenger to be identified to the vehicle 10.

Note that the example where the server apparatus 300 converts the first information into the second information has been described. In this embodiment, the vehicle-mounted device 100 may convert the first information into the second information. Alternatively, the passenger terminal 200 may converts the first information into the second information.

Third Embodiment

Next, a third embodiment of the present disclosure is described. Note that in this embodiment, detailed description of components substantially identical to those in the aforementioned first embodiment and substantially identical control processes is omitted.

As described in the second embodiment, the passenger does not wish that the own face information is transmitted to the vehicle 10 owned by another person in some cases. Even if the first information does not include the face information allowing the passenger to be identified, the passenger does not wish that the first information that is the image information where the own appearance has been taken is stored, in some cases.

Accordingly, in the passenger information generating system according to this embodiment, the server apparatus 300 converts the first information into the second information. After conversion of the first information into the second information is completed, the server apparatus 300 then removes the first information. This is described based on FIG. 19.

FIG. 19 is a diagram exemplifying the flow of the operation of the passenger information generating system according to this embodiment. As described in FIG. 13, the server apparatus 300 registers the first information in the first information database D320 (S103). Accordingly, the first information is stored in the auxiliary memory unit 303 of the server apparatus 300. The server apparatus 300 then converts the stored first information into the second information (S104). The second information may be information allowing the driver of the vehicle 10 to be notified by audio described above, or image information where the predetermined information allowing the face of the passenger to be identified is removed as described above. The first information database D320 of the auxiliary memory unit 303 corresponds to the memory unit according to the present disclosure.

When the second information is registered in the second information database D330 (S105), the processor 301 of the server apparatus 300 removes the first information from the first information database D320 in this embodiment. That is, the processor 301 executes a process of removing the first information from the auxiliary memory unit 303 (S401).

Accordingly, the passenger information is generated, while preventing a situation of storing, in the server apparatus 300, the first information that is the image information where the appearance of the passenger has been taken.

Fourth Embodiment

Next, a fourth embodiment of the present disclosure is described. Note that in this embodiment, detailed description of components substantially identical to those in the aforementioned first embodiment and substantially identical control processes is omitted.

FIG. 20 is a diagram exemplifying the hardware configurations of the vehicle 10, the passenger terminal 200, and the server apparatus 300 according to this embodiment.

In this embodiment, the vehicle 10 includes the vehicle-mounted device 100, the notification device 110, and a camera 120. Furthermore, the vehicle-mounted device 100 includes a processing unit 101, and a communication unit 102.

The camera 120 is a camera provided for the vehicle 10 and is, for example, an imaging device that includes an image sensor, such as Charged-Coupled Devices (CCD), Metal-oxide-semiconductor (MOS) or Complementary Metal-Oxide-Semiconductor (CMOS). Accordingly, the vehicle 10 can acquire an image (still image or moving image) therearound. Note that cameras 120 may be provided at multiple spots on the body of the vehicle 10 (for example, front, rear, left and right).

The vehicle 10 can then transmit the image taken by the camera 120 to the server apparatus 300 via the communication unit 102. Note that the operation of the camera 120 and transmission of the taken image are controlled by the processing unit 101.

The vehicle 10 having such a configuration can acquire third information that is information related to appearances of passersby around the vehicle 10, and transmit it to the server apparatus 300. Note that the camera 120 acquires the third information, which is then transmitted to the server apparatus 300 via the communication unit 102, thereby achieving the acquisition unit according to the present disclosure.

The server apparatus 300 having received the third information can perform user determination that determines whether the passenger is included in the passersby around the vehicle 10, on the basis of the third information and the first information. This is hereinafter described.

FIG. 21 is a diagram exemplifying the functional configuration of the server apparatus 300 according to this embodiment. The server apparatus 300 includes, as functional components: a reservation processing unit F310; a first information acquisition unit F320; a passenger information generating unit F330; a passenger information providing unit F340; a user determination unit F350; a use management database D310; a first information database D320; and a second information database D330. The user determination unit F350 includes a third information acquisition unit F351, and a determination processing unit F352.

The third information acquisition unit F351 acquires the third information transmitted from the vehicle 10. The third information acquisition unit F351 acquires the third information transmitted from the vehicle 10, through reception by the communication unit 304.

The determination processing unit F352 then executes a process of user determination on the basis of the third information and the first information. The determination processing unit F352 can execute the user determination process by applying a publicly known image analysis process. For example, the determination processing unit F352 may execute the user determination process by geometrically comparing the third information with the first information and determining whether the third information includes information identical or similar to the first information or not, or may execute the user determination process by statistically quantifying such information.

The passenger information generating unit F330 according to this embodiment includes an information conversion unit F331, and an additional information generating unit F332. The passenger information generating unit F330 can then generate the passenger information by including the additional information generated by the additional information generating unit F332 to the second information converted from the first information by the information conversion unit F331. The additional information generating unit F332 can generate, as the additional information, for example, information representing that the passenger is detected from the passersby around the vehicle 10, and information related to the position of the detected passenger.

Next, the flow of operation of the passenger information generating system according to this embodiment is described. FIG. 22 is a diagram exemplifying the flow of the operation of the passenger information generating system according to this embodiment.

In this embodiment, images of the passersby around the vehicle 10 are taken by the camera 120 provided for the vehicle 10, thereby generating the third information (S501). The vehicle-mounted device 100 then transmits the third information to the server apparatus 300 (S502).

The server apparatus 300 acquires the third information transmitted from the vehicle-mounted device 100, through reception by the communication unit 304 (S503). The user determination process is then executed (S504). The details of the user determination process are as described about the determination processing unit F352. The server apparatus 300 generates the additional information as described above, on the basis of the results of the user determination process, and generates the passenger information that includes the second information and the additional information (S506). The generated passenger information is transmitted to the vehicle-mounted device 100 (S107).

The vehicle-mounted device 100 acquires the passenger information transmitted from the server apparatus 300, through reception by the communication unit 102 (S108). The vehicle-mounted device 100 activates the notification device 110 (S109), and notifies the passenger information to the driver of the vehicle 10. Note that the vehicle-mounted device 100 repetitively generates and transmits the third information at a predetermined cycle until acquiring the passenger information.

In such a passenger information generating system, the vehicle-mounted device 100 can more preferably notifying the passenger information to the driver of the vehicle 10 using the notification device 110. For example, in a case where the second information is information allowing the driver to be notified by audio, the vehicle-mounted device 100 can notify the driver of the bearing where the passenger resides together with audio information representing the predetermined characteristic part of the appearance of the passenger, using a speaker. Alternatively, for example, in a case where the second information is image information where the predetermined information allowing the face of the passenger to be identified is excluded, the vehicle-mounted device 100 may display the position of the passenger together with the image information on the output screen of the navigation system, or display the position of the passenger together with the image information on an HUD (Head-Up Display) provided for the vehicle 10.

Note that the additional information included in the passenger information is not limited to what is described above and, for example, may be information representing whether the passenger has been detected from the passersby around the vehicle 10 or not. The passenger information that does not include the additional information may be adopted. In this case, the server apparatus 300 may transmit the passenger information to the vehicle-mounted device 100 at timing when the passenger is detected from the passersby around the vehicle 10, in the flow of the operation described above.

According to the passenger information generating system described above, the passenger can be more easily grasped by the driver driving the vehicle 10. That is, the passenger information generating system according to this embodiment enables the driver of the vehicle to grasp more easily a passenger having requested a ride in the vehicle during driving.

Other Embodiments

The embodiments described above are only examples. The present disclosure can be appropriately changed and executed in a scope without departing from the gist.

The passenger information generating system according to this embodiment is not limited to the application to rideshare as described above and, for example, may be used for a case of providing a taxi driver with information related to a taxi customer.

The processes and configurations described in this disclosure can be freely combined and executed unless a technical contradiction occurs.

The process described as what is performed by a single device may be shared among multiple devices and executed. Alternatively, the processes described as what is performed by different devices may be executed by a single device. In a computer system, a hardware configuration (server configuration) that executes each function can be flexibly changed.

The present disclosure can be also achieved by providing a computer with a computer program where the functions described in the embodiments are implemented, and by causing one or more processors included in the computer to read and execute the program. Such a computer program may be provided for the computer through a non-transitory computer readable storage medium connectable to a system bus of the computer, or provided for the computer via a network. The non-transitory computer readable storage medium may be, for example, any type of disk, such as a magnetic disk (floppy (R) disk, hard disk drive (HDD), etc.) or an optical disk (CD-ROM, DVD disk, blu-ray disk, etc.), or a read only memory (ROM), a random access memory (RAM), EPROM, EEPROM, a magnetic card, a flash memory or an optical card, or any type of medium suitable for storing electronic instructions.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory; and
at least one processor configured to:
receive first information that is image information related to an appearance of a passenger who has requested a ride in a vehicle being driven by a driver via a passenger terminal of the passenger, the image information being taken by a camera of the passenger terminal, the first information being transmitted from the passenger terminal, the vehicle including a speaker that notifies the driver of information by audio;
store the received first information in the memory;
extract, from the first information stored in the memory, second information that is information including gender, body shape and clothes of the passenger and is text information or audio information by comparing the first information with a template with which information related to appearances of people are associated, the appearances of people including genders, body shapes and clothes of the people;

store the extracted second information in the memory;

after storing the extracted second information in the memory, remove, from the memory, the first information from which the second information has been extracted;

after removing the first information from the memory, generate passenger information that includes the second information stored in the memory; and transmit the generated passenger information to the vehicle.

2. The information processing apparatus according to claim 1, wherein the second information does not include image information regarding a face of the passenger.

3. The information processing apparatus according to claim 1, wherein a data size of the second information is smaller than a data size of the first information.

4. The information processing apparatus according to claim 1, wherein the first information contains image information regarding clothes of the passenger.

5. The information processing apparatus according to claim 1, further comprising:

a memory unit that stores the received first information, wherein the at least one processor generates the passenger information by extracting the second information from the first information stored in the memory unit, and the at least one processor immediately removes the first information from the memory unit after the second information is extracted from the first information.

6. An information processing system, comprising:

a vehicle comprising a speaker that is placed within the vehicle;

a passenger terminal comprising a camera, wherein a passenger requests a ride in the vehicle via the passenger terminal; and a server comprising a memory and a controller, wherein the passenger terminal is configured to:

generate first information that is image information related to an appearance of the passenger by taking the appearance of the passenger by the camera; and transmit the generated first information to the server, the controller of the server is configured to:

receive the first information transmitted from the passenger terminal;

store the received first information in the memory;

extract, from the first information stored in the memory, second information that is information including gender, body shape and clothes of the passenger and is text information or audio information by comparing the first information with a template with which information related to appearances of people are associated, the appearances of people including genders, body shapes and clothes of the people;

store the extracted second information in the memory;

after storing the extracted second information in the memory, remove, from the memory, the first information from which the second information has been extracted;

after removing the first information from the memory, generate passenger information, the passenger information including the second information stored in the memory;

transmit the generated passenger information to the vehicle, and wherein the vehicle is configured to:

receive the passenger information transmitted from the server; and cause the speaker to output the second information being included in the received passenger information by audio.

7. The information processing system according to claim 6, wherein the vehicle further comprises an acquisition unit, the acquisition unit being configured to:

acquire third information that is related to a person identified in an image of surroundings of the vehicle; and transmit the third information to the server, wherein the controller determines whether the first information is included in the third information based on the third information and the first information.

8. A computer-implemented information processing method comprising:

receiving first information that is image information related to an appearance of a passenger, wherein the passenger has requested a ride in a vehicle being driven by a driver via a passenger terminal of the passenger, the image information being taken by a camera of the passenger terminal, the first information being transmitted from the passenger terminal, the vehicle including a speaker that notifies the driver of information by audio;

storing the received first information in a memory of a computer;

extracting, from the first information stored in the memory, second information that is information including gender, body shape and clothes of the passenger and is text information or audio information by comparing the first information with a template with which information related to appearances of people are associated, the appearances of people including genders, body shapes and clothes of the people;

storing the extracted second information in the memory;

after storing the extracted second information in the memory, removing, from the memory, the first information from which the second information has been extracted;

after removing the first information from the memory, generating passenger information, the passenger information including the second information stored in the memory; and transmitting the generated passenger information to the vehicle.

9. A non-transitory storage medium storing an information processing program causing a computer including a memory to execute a control process, the control process comprising:

receiving first information that is image information related to an appearance of a passenger who has requested a ride in a vehicle being driven by a driver via a passenger terminal of the passenger, the image information being taken by a camera of the passenger terminal, the first information being transmitted from the passenger terminal, the vehicle including a speaker that notifies the driver of information by audio;

storing the received first information in the memory;

extracting, from the first information stored in the memory, second information that is information including gender, body shape and clothes of the passenger and is text information or audio information by comparing the first information with a template with which information related to appearances of people are associated, the appearances of people including genders, body shapes and clothes of the people;

storing the extracted second information in the memory;

after storing the extracted second information in the memory, removing, from the memory, the first information from which the second information has been extracted;

generating passenger information, the passenger information including the second information stored in the memory; and transmitting the generated passenger information to the vehicle.

\* \* \* \* \*